(12) United States Patent
de Souza Borges Ferreira et al.

(10) Patent No.: US 11,150,633 B2
(45) Date of Patent: Oct. 19, 2021

(54) SYSTEM AND METHOD FOR AUTOMATED GEOMETRIC SHAPE DEVIATION MODELING FOR ADDITIVE MANUFACTURING

(71) Applicants: Purdue Research Foundation, West Lafayette, IN (US); University of Southern California, Los Angeles, CA (US)

(72) Inventors: Raquel de Souza Borges Ferreira, West Lafayette, IN (US); Arman Sabbaghi, West Lafayette, IN (US); Qiang Huang, Los Angeles, CA (US); Kevin Amstutz, West Lafayette, IN (US)

(73) Assignees: Purdue Research Foundation, West Lafayette, IN (US); University Of Southern California, Los Angeles, CA (US)

( * ) Notice: Subject to any disclaimer, the term of this patent is extended or adjusted under 35 U.S.C. 154(b) by 139 days.

(21) Appl. No.: 16/411,035

(22) Filed: May 13, 2019

(65) Prior Publication Data
US 2019/0346830 A1 Nov. 14, 2019

Related U.S. Application Data

(60) Provisional application No. 62/671,190, filed on May 14, 2018.

(51) Int. Cl.
*G05B 19/4099* (2006.01)
*G05B 13/02* (2006.01)
*B33Y 50/02* (2015.01)

(52) U.S. Cl.
CPC ......... *G05B 19/4099* (2013.01); *B33Y 50/02* (2014.12); *G05B 13/0265* (2013.01);
(Continued)

(58) Field of Classification Search
CPC ...... G05B 13/0265; G05B 2219/49007; G05B 2219/35134; B33Y 50/02; B33Y 50/00; B29C 64/386
See application file for complete search history.

(56) References Cited

U.S. PATENT DOCUMENTS 9,827,717 B2 11/2017 Huang et al.
9,886,526 B2 2/2018 Huang
(Continued)

FOREIGN PATENT DOCUMENTS

CN 104537033 A * 4/2015 ............. G06F 16/00
CN 105160059 A * 12/2015

OTHER PUBLICATIONS

Huang, et. al., "Predictive modeling of geometric deviations of 3D printed products Products—A Unified Modeling Approach for Cylindrical and Polygon Shapes", 2014 IEEE International Conference on Automation Science and Engineering (CASE), Taipei, Taiwan, Aug. 18-22, 2014 (Year: 2014).*
(Continued)

*Primary Examiner* — Chun Cao
*Assistant Examiner* — Michael Tang
(74) *Attorney, Agent, or Firm* — Piroozi-IP, LLC

(57) ABSTRACT

A method for providing a 3D shape model for a new process in an additive manufacturing system includes receiving an unoptimized 3D model of one or more shapes based on a first process (P1); receiving deviation information based on P1; baseline deviation modeling of P1 based on the received unoptimized 3D model and the received deviation information to thereby generate an optimized 3D model for the one or more shapes based on P1; applying a transfer function that connects deviation information of P1 to deviation information of a second process (P2); receiving deviation information based on P2; adaptively modeling the deviations of P2 based on the transformed baseline model and the deviation
(Continued)

information of P2; generating an optimized 3D model for the one or more shapes based on P2; and generating a compensation plan for additively manufacturing the one or more shapes between P1 and P2.

18 Claims, 21 Drawing Sheets

(52) U.S. Cl.
CPC ........... *G05B 2219/35134* (2013.01); *G05B 2219/49007* (2013.01)

(56) References Cited

U.S. PATENT DOCUMENTS

| | | | |
|---|---|---|---|
| 2016/0046076 A1* | 2/2016 | Huang | B29C 64/129 700/98 |
| 2016/0299996 A1 | 10/2016 | Huang | |
| 2016/0320771 A1* | 11/2016 | Huang | B29C 67/00 |
| 2017/0368753 A1* | 12/2017 | Yang | G05B 19/4099 |
| 2018/0275634 A1* | 9/2018 | Mcfarland | G05B 19/4099 |
| 2018/0284735 A1* | 10/2018 | Cella | G01M 13/045 |
| 2019/0004496 A1* | 1/2019 | Blom | G05B 19/4099 |

OTHER PUBLICATIONS

Sabbaghi, te. al., "Predictive Model Building Across Different Process Conditions and Shapes in 3D Printing", 2016 IEEE International Conference on Automation Science and Engineering (CASE), Fort Worth, TX, USA, Aug. 21-24, 2016 (Year: 2016).*

Sabbaghi, te. al., "Bayesian additive modeling for Quality Control of 3D Printed Products", 2015 IEEE International Conference on Automation Science and Engineering (CASE), Gothenburg, Sweden, Aug. 24-28, 2015 (Year: 2015).*

Soria-Olivas et. al., "BELM: Bayesian extreme learning machine" IEEE Transactions on Neural Networks, vol. 22, No. 3, Mar. 2011, p. 505-509 (Year: 2011).*

Cheng, et al., "A Statistical Transfer Learning Perspective for Modeling Shape Deviations in Additive Manufacturing," Oct. 2017, IEEE Robotics and Automation Letters, vol. 2, No. 4.

Baumann et al., "Abstract API for 3D Printing Hardware and Software Resources," 2017, Int J Adv Manuf Technol, 92:1519-1535.

Cheng et al., "A Prediction and Compensation Scheme for Inplane Shape Deviation of Additive Manufacturing With Information on Process Parameters," Feb. 8, 2018, IISE Transactions, vol. 50, No. 5, 394-406.

Chowdhury, "Artificial Neural Network Based Geometric Compensation for Thermal Deformation in Additive Manufacturing Processes," Nov. 2, 2016, Master's Thesis.

Chowdhury et al., "Part Build Orientation Optimization and Neural Network-Based Geometric Compensation for Additive Manufacturing Process," Mar. 2018, Journal of Manufacturing Science and Engineering, vol. 140, 031009:1-15.

Chowdhury et al., "Artificial Neural Network Based Geometric Compensation for Thermal Deformation in Additive Manufacturing Processes," Jun. 27, 2016, Proceedings of the ASME 2016 International Manufacturing Science and Engineering Conference.

Huang , "An Analytical Foundation for Optimal Compensation of Three-Dimensional Shape Deformation in Additive Manufacturing," Jun. 2016, Journal of Manufacturing Science and Engineering, vol. 138, 061010: 1-8.

Huang et al., "Statistical Predictive Modeling and Compensation of Geometric Deviations of Three-Dimensional Printed Products," Dec. 2014, Journal of Manufacturing Science and Engineering, vol. 136, 061008: 1-10.

Huang et al., "Predictive Modeling of Geometric Deviations of 3D Printed Products—A Unified Modeling Approach for Cylindrical and Polygon Shapes," 2014, IEEE International Conference on Automation Science and Engineering.

Huang et al., "Optimal Offline Compensation of Shape Shrinkage for Three-Dimensional Printing Processes," 2015, IIE Transactions vol. 47, 431-441.

Jin et al., "Prescriptive Analytics for Understanding of Out-of-Plane Deformation in Additive Manufacturing," 2016.

Jin, et al., "Offline Predictive Control of Out-of-Plane Shape Deformation for Additive Manufacturing," Dec. 2016, Journal of Manufacturing Science and Engineering, vol. 138, 121005: 1-7.

Luan et al., "Predictive Modeling of In-Plane Geometric Deviation for 3D Printed Freeform Products," 2015.

Luan et al., "Prescriptive Modeling and Compensation of In-Plane Shape Deformation for 3-D Printed Freeform Products," Jan. 2017, IEEE Transactions on Automation Science and Engineering, vol. 14, No. 1.

Moroni et al., "Towards Early Estimation of Part Accuracy in Additive Manufacturing," 2014, Procedia CIRP, 21, 300-305.

Navangul et al., "Error Minimization in Layered Manufacturing Parts by Stereolithography File Modification Using a Vertex Translation Algorithm," Jun. 2013, Journal of Manufacturing Science and Engineering, vol. 135, 031006: 1-13.

Sabbaghi et al., "Predictive Model Building Across Different Process Conditions and Shapes in 3D Printing," Aug. 21, 2016, 2016 IEEE International Conference on Automation Science and Engineering.

Sabbaghi et al., "Inference for Deformation and Interference in 3D Printing," 2014, The Annals of Applied Statistics, vol. 8, No. 3, 1395-1415.

Sabbaghi et al., "Bayesian Additive Modeling for Quality Control of 3D Printed Products," Aug. 24, 2015, 2015 IEEE International Conference on Automation Science and Engineering.

Schmutzlera et al., "Compensating Warpage of 3D Printed Parts Using Free-Form Deformation," 2016, Procedia CIRP 41, 1017-1022.

Tong et al., "Parametric Error Modeling and Software Error Compensation for Rapid Prototyping," 2003, Rapid Prototyping Journal vol. 9, No. 5, 301-313.

Tong et al., "Error Compensation for Fused Deposition Modeling (FDM) Machine by Correcting Slice Files," 2008, Rapid Prototyping Journal, 14/1, 4-14.

Wang et al., "Influence of Process Parameters on Stereolithography Part Shrinkage," 1996, Materials & Design. vol. 17, No. 4, pp. 205-213.

Wang et al., "In-Plane Shape-Deviation Modeling and Compensation for Fused Deposition Modeling Processes," Apr. 2017, IEEE Transactions on Automation Science and Engineering, vol. 14, No. 2.

Xu et al., "Shape Deviation Modeling for Dimensional Quality Control in Additive Manufacturing," Nov. 15, 2013, Proceedings of the ASME 2013 International Mechanical Engineering Congress and Exposition.

* cited by examiner

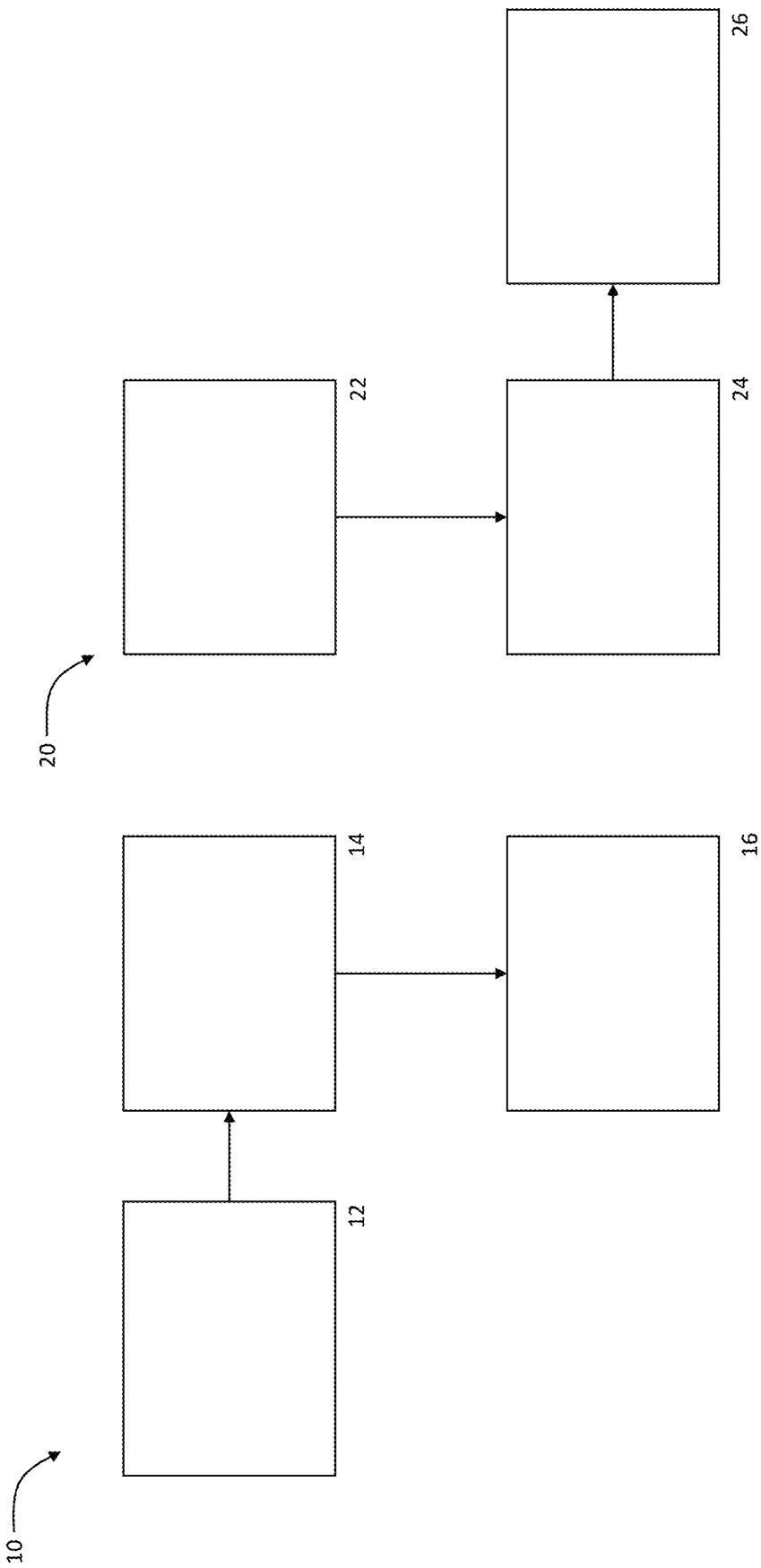

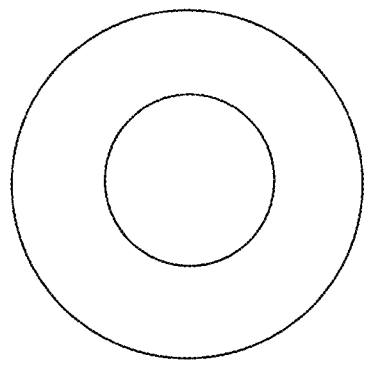
FIG. 4d
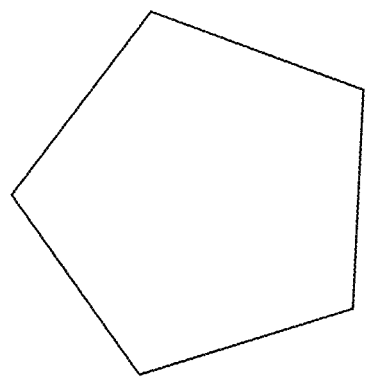
FIG. 4c
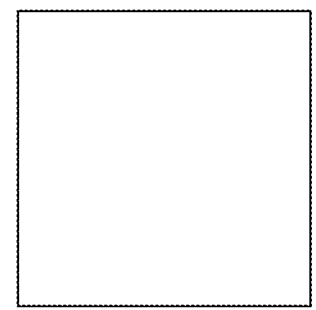
FIG. 4b
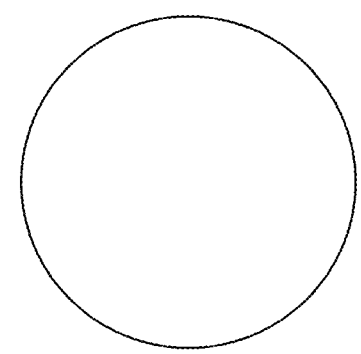
FIG. 4a
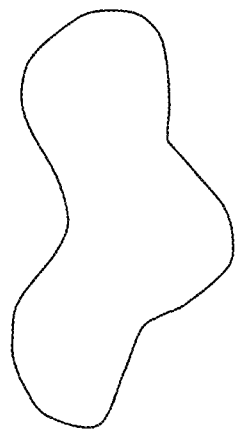
FIG. 4h
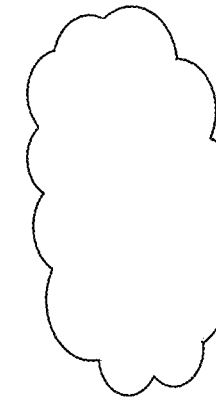
FIG. 4g
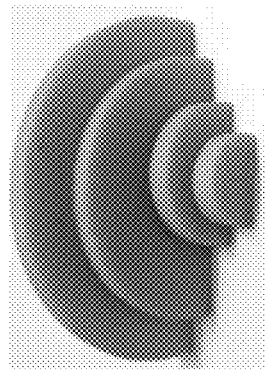
FIG. 4f
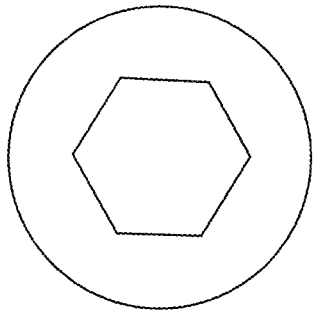
FIG. 4e
FIGs. 4a, 4b, 4c, 4d, 4e, 4f, 4g, 4h

SYSTEM AND METHOD FOR AUTOMATED GEOMETRIC SHAPE DEVIATION MODELING FOR ADDITIVE MANUFACTURING

CROSS-REFERENCE TO RELATED APPLICATIONS

The present patent application is related to and claims the priority benefit of U.S. Provisional Patent Application Ser. No. 62/671,190 filed May 14, 2018, the contents of which are hereby incorporated by reference in its entirety into the present disclosure.

STATEMENT REGARDING GOVERNMENT FUNDING

This invention was made with government support under CMMI 1544841 and CMMI 1544917 awarded by the National Science Foundation. The government has certain rights in the invention.

TECHNICAL FIELD

This specification relates to additive manufacturing (AM), and particularly to a system and method for predicting shape deviation error and compensating therefor when changing printing processes or shapes of an object to be manufactured.

BACKGROUND

This section introduces aspects that may help facilitate a better understanding of the disclosure. Accordingly, these statements are to be read in this light and are not to be understood as admissions about what is or is not prior art.

AM has gained a significant amount of interest in recent years. To manufacture a complex object, traditionally several methods have been employed, e.g., fixed tool manufacturing such as injection molding. However, as the tools age, shape deviations are introduced into the parts until such deviations are no longer acceptable. At such point, the tools will need to be repaired or replaced. With the advent of additive manufacturing and three-dimensional (3D) printing, objects can be manufactured layer-by-layer. As such, shape deviation can be accounted, as discussed in the U.S. Pub. App. No. 20160320771 for Huang. In the '771 publication Huang discloses a method of compensating for deviation to thereby minimize shape deviation during manufacturing by an AM machine. The method includes obtaining a deviation model for an AM machine, receiving a 3D model of an object to be built using the AM machine, predicting shape deviation for the object using the deviation model applied to the 3D model, minimizing the predicted deviation by selecting an amount of deviation compensation, and modifying the 3D model based on the selected amount of deviation compensation. However, Huang and others have not addressed changes and shifts in process resulting in a priori changes in deviation model and/or changes in shapes (e.g., from a circular cylinder shape to a pentagonal cylinder shape), or more intelligently based on real-time data.

Furthermore, the statistical model of shape deviations used by Huang to derive compensation and thereby modifications to the CAD model is rendered difficult by at least three reasons that result from the nature and capability of AM for one-of-a-kind manufacturing. First, objects that are to be manufactured using an AM process have myriad shapes and complex geometries. Second is the spectrum of AM processes and variations in those processes that can yield a broad range of complicated deviation patterns. Third, there typically exist a small collection of shape deviation data that can possibly be used to specify statistical deviation models for a large number of AM processes, and a significant amount of time is needed to develop these statistical models for new shapes.

Therefore, there is an unmet need for a novel approach to compensate for geometric shape deviation and minimize deviation during manufacturing by an AM machine that result from changes in process and/or shape by a priori or real-time adjustments to the 3D model of the object to be printed.

SUMMARY

A method performed by a computer system including a processor and a memory for providing a 3D shape model for a new process in an additive manufacturing (AM) system is disclosed. The method includes receiving an unoptimized 3D model of one or more shapes based on a first process. The method further includes receiving deviation information based on the first process. The deviation information of the first process defines AM deviations of the one or more shapes, both in-plane and out-of-plane, based on the first process. The method also includes baseline deviation modeling of the first process based on the received unoptimized 3D model and the received deviation information. Furthermore, the method includes generating an optimized 3D model for the one or more shapes based on the first process based on the initial optimizing step. The method then includes applying a transfer function that connects deviation information of the first process to deviation information of a second process to the optimized 3D model to thereby transform the baseline model for the second process. The process then includes receiving deviation information based on the second process. The deviation information of the second process defines AM deviations, both in-plane and out-of-plane, based on the second process. The method then includes adaptively modeling the deviations of the second process based on the transformed baseline model and the deviation information of the second process. Thereafter, the method includes generating an optimized 3D model for the one or more shapes based on the second process and based on the adaptive modeling of deviations step. The method then includes generating a compensation plan for additively manufacturing the one or more shapes between the first and the second processes.

Another method performed by a computer system including a processor and a memory for providing a 3D shape model for a new shape in an additive manufacturing system is disclosed. The method includes receiving an unoptimized 3D model for a first shape based on a process. The method further includes receiving deviation information based on the process, where the deviation information of the process defines AM deviations, both in-plane and out-of-plane, for the first shape based on the process. The method then includes baseline deviation modeling of the first process based on the received unoptimized 3D model and the received deviation information. The method also includes generating an optimized 3D model for the first shape based on the process based on the initial optimizing step. Furthermore, the method includes receiving an unoptimized 3D model of the second shape based on the process. In addition, the method includes applying a delta function to the baseline deviation model for the first shape, generated optimized 3D model for the first shape, observed deviation data for the second shape, and to the received unoptimized 3D model of the second shape. The delta function connects the baseline deviation model for the first shape to an unoptimized 3D model of a second shape based on the process. The method then includes adaptively modeling deviations of the second shape based on the applied delta function and the received unoptimized 3D model of the second shape. The method then includes generating an optimized 3D model for the second shape based on the adaptive modeling of deviations step. Thereafter, the method includes generating a compensation plan for additively manufacturing the second shape based on the process.

Yet another method performed by a computer system including a processor and a memory for providing a 3D shape model for a new process and a new shape in an additive manufacturing (AM) system is disclosed. The method includes receiving an unoptimized 3D model of a first shape based on a first process. The method further includes receiving deviation information based on the first process. The deviation information of the first process defines AM deviations of the first shape, both in-plane and out-of-plane, based on the first process. The method also includes baseline deviation modeling of the first process based on the received unoptimized 3D model and the received deviation information. Furthermore, the method includes generating an optimized 3D model for the first shape based on the first process based on the initial optimizing step. The method then includes applying a transfer function that connects deviation information of the first process to deviation information of a second process to the optimized 3D model to thereby transform the baseline model for the second process. The process then includes receiving deviation information based on the second process. The deviation information of the second process defines AM deviations, both in-plane and out-of-plane, based on the second process. The method then includes adaptively modeling the deviations of the second process based on the transformed baseline model and the deviation information of the second process. Thereafter, the method includes generating an optimized 3D model for the first shape based on the second process and based on the adaptively modeling deviations step. The method then includes receiving an unoptimized 3D model of a second shape based on the second process. Furthermore, the method includes applying a delta function to the generated optimized 3D model for the first shape under the second process, observed deviation data for the second shape under the second process, and to the received unoptimized 3D model of the second shape under the second process. The delta function connects the optimized 3D model of the first shape to an unoptimized 3D model of a second shape based on the second process. The method also includes second adaptively modeling deviations of the second shape based on the applied delta function and the received unoptimized 3D model of the second shape under the second process. The method then includes generating an optimized 3D model for the second shape based on the second process and based on the adaptively modeling deviations step, and generating a compensation plan for additively manufacturing the second shape based on the second process.

BRIEF DESCRIPTION OF DRAWINGS

FIG. 1a is a high level block diagram showing a system according to one embodiment of the present disclosure directed to two processes (Process A and Process B) and two shapes (Shape 1 and Shape 2) for manufacture.

FIG. 1b is another high level block diagram showing a system according to another embodiment of the present disclosure also directed to two processes (Process A and Process B) and two shapes (Shape 1 and Shape 2) for manufacture.

FIGS. 4a, 4b, 4c, 4d, 4e, 4f, 4g, and 4h show schematics of some of the exemplary shapes of manufactured products, according to the present disclosure.

DETAILED DESCRIPTION

Figure 1C:
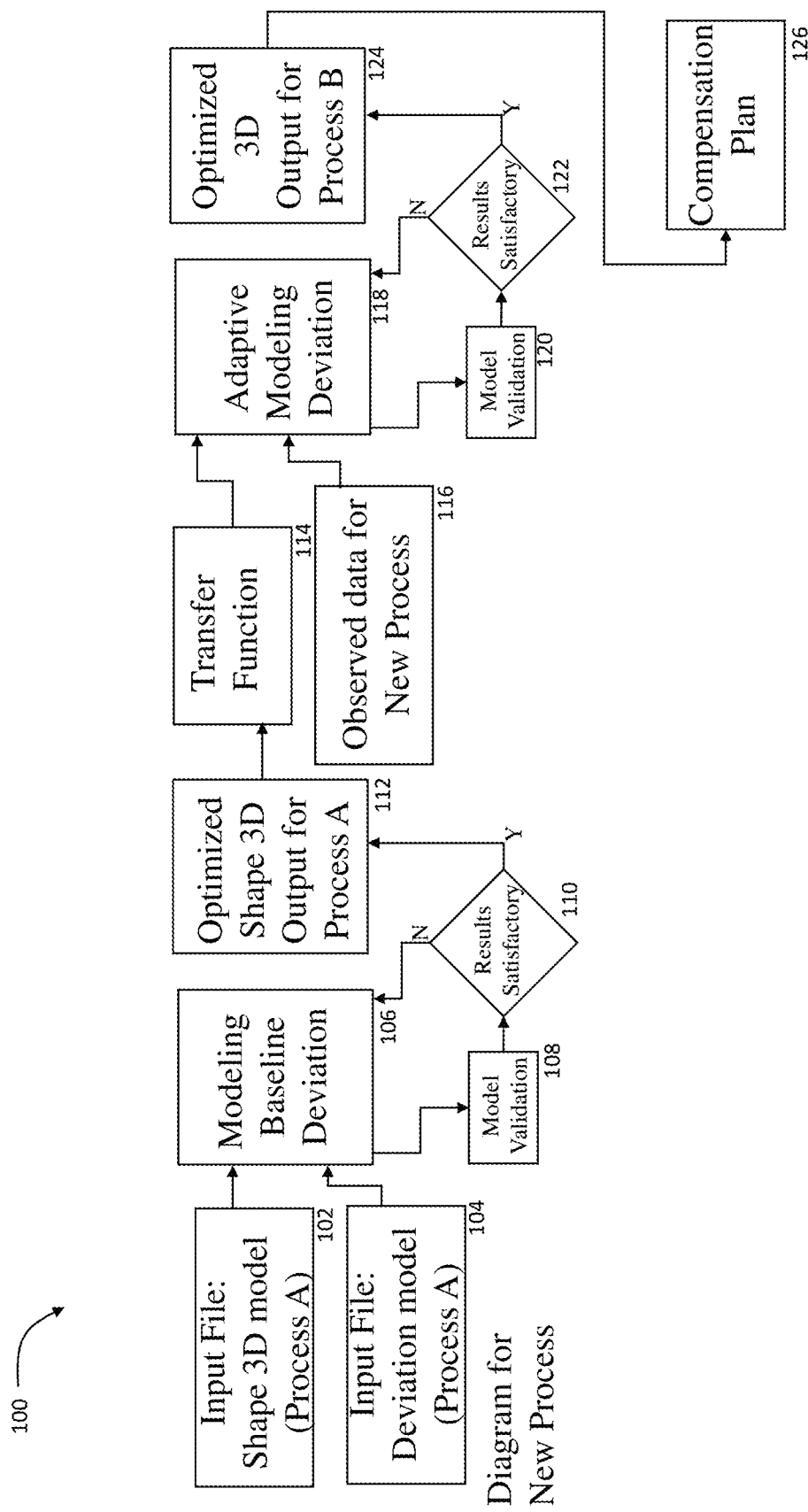
FIG. 1c is a block diagram depicting blocks in a system according to one embodiment of the present disclosure capable of carrying out some of the steps shown in FIGS. 1a and 1b.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

In the present disclosure, processes A, B, and C refer to a baseline process of a stereolithography machine (Process A), a new setting of the stereolithography machine (Process B), and the deviation of cavities under a particular setting of the stereolithography machine (Process C), respectively.

A novel system and method to compensate for geometric shape deviation and to minimize deviation during manufacturing by an additive manufacturing (AM) machine resulting from changes in process and/or shape of an object is disclosed by a priori or real-time adjustments to a 3D model of the object to be printed.

Referring to FIG. 1a, a block diagram showing a system 10 according to one embodiment of the present disclosure is provided. The system 10 includes two processes (Process A and Process B) and two shapes (Shape 1 and Shape 2) for manufacture. A known model 12 is initially provided for the first shape (Shape 1) under the first process (Process A). The flow in the system 10 includes learning a deviation model $f_{1,B}$ for the first shape (Shape 1) under the second process (Process B) using knowledge of the deviation model $f_{1,A}$ for the first shape (Shape 1) under the first process (Process A), as shown in Block 14. Next the flow of the system 10 includes specifying a deviation model $f_{2,B}$ for the second shape (Shape 2) under the second process (Process B) using deviation knowledge (process and shape) of all of the models for the previously manufactured products, in an automated manner, as shown in Block 16.

Referring to FIG. 1b, a block diagram showing a system 20 according to another embodiment of the present disclosure is provided. The system 20 also includes two processes (Process A and Process B) and two shapes (Shape 1 and Shape 2) for manufacture. A known model 22 is initially provided for the first shape (Shape 1) under the first process (Process A). The flow in the system 20 includes learning a deviation model $f_{2,A}$ for the second shape (Shape 2) under the first process (Process A) using knowledge of the deviation model $f_{1,A}$ for the first shape (Shape 1) under the first process (Process A), as shown in Block 24. Next the flow of the system 20 includes specifying a deviation model $f_{2,B}$ for the second shape (Shape 2) under the second process (Process B) using deviation knowledge (process and shape) of all of the models for the previously manufactured products, in an automated manner, as shown in the Block 26.

The systems 10 and 20 shown in FIGS. 1a and 1b represent two distinct approaches from the same starting and reaching the same end point, each with its own associated mathematics, discussed further below.

Figure 1D:
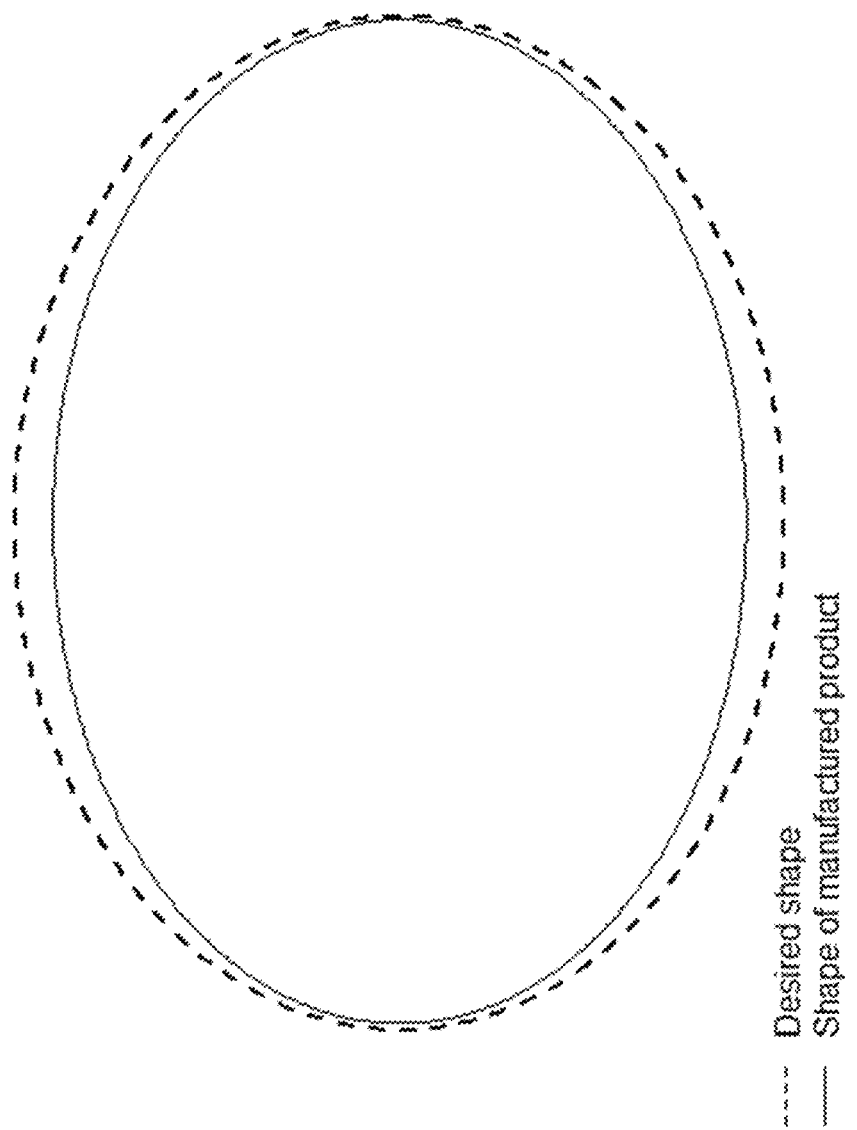
FIG. 1d is a schematic of a desired shape to be manufactured (an elliptical shape) shown in broken line, with the actual manufactured shape shown in solid line.
Figure 1E:
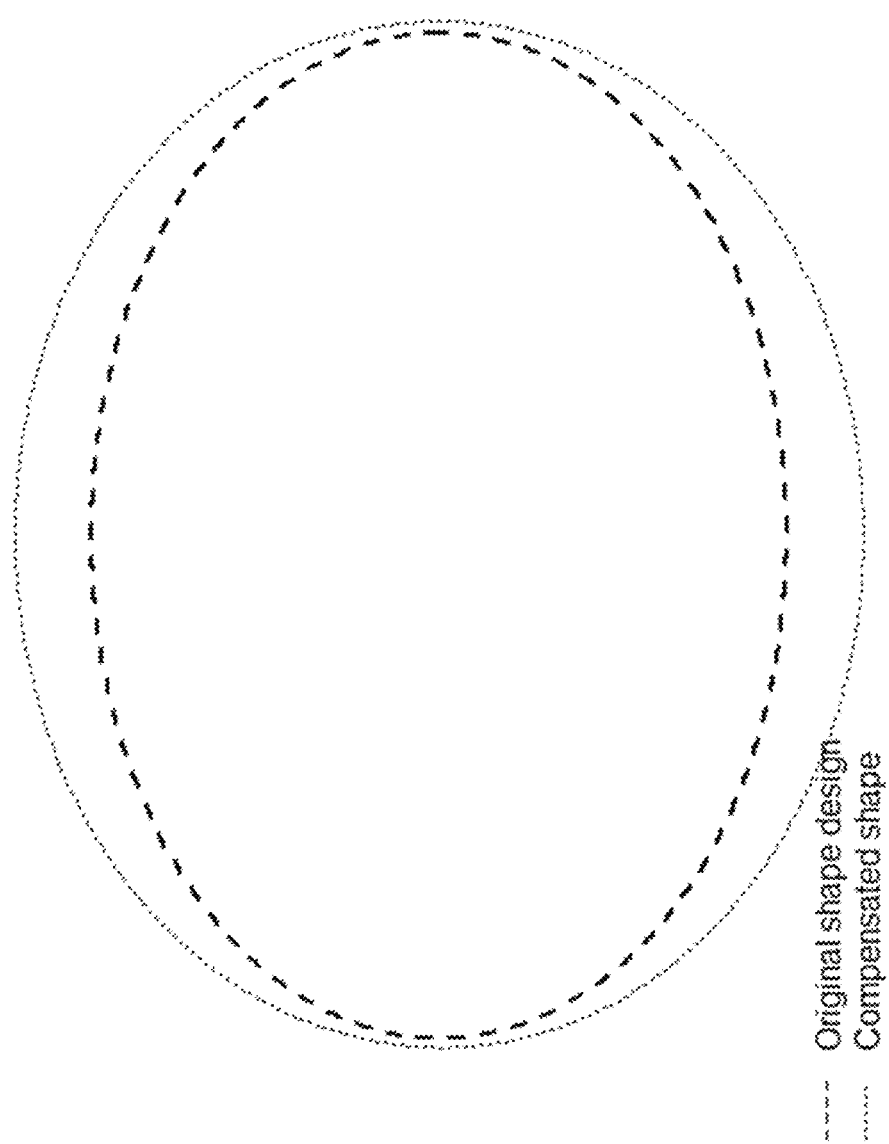
FIG. 1e is a schematic of a compensated shape for a desired shape to be manufactured (an elliptical shape) shown in broken line, with the compensated shape shown in dotted line.

Referring to FIG. 1c, a block diagram is provided depicting blocks in a system 100 according to the present disclosure capable of carrying out some of the steps shown in FIGS. 1a and 1b. In particular, FIG. 1c provides the steps between flow steps 12 and 14 in FIG. 1a and between flow steps 24 and 26 in FIG. 1b. As such FIG. 1c is related to changes in the process. In the case of a new process, the system 100 shown in FIG. 1c starts on the left side by receiving an unoptimized 3D model of one or more shapes for a first process (Process A), as shown in Block 102. This input file provides a conventional model for various shapes for a particular AM process. For example, a cylindrical shape may be presented as stacks of 2D circles formed (or, in the case of a 3D printer, printed) vertically to form the 3D cylinder. The input file in Block 102 then is a representation of a circle. The system 100 also provides an input file in Block 104 directed to the deviation model for the first process (Process A). This input file in Block 104 is generally constructed to capture deviation of the AM machine over a period of time. In particular, an AM machine may begin its life forming parts with some deviations. In addition, the AM machine thereafter may introduce additional deviations due to wear. The input file in Block 104 provides a model for such deviations (i.e., initial and time-dependent variations) from the desired shapes based on measurements of the parts formed by the AM machine (data based on measurements, not shown, are implicitly included in Blocks 102 and 104). For example, with respect to various boundaries, the input file in Block 104 defines the manufacturing quality (i.e., deviation) in both in-plane and out-of-plane with respect to the demanded output for the first process (Process A). An example of this input file is one that contains computer code for the general statistical model that can be fit given the data by executing the code in a particular programming language (e.g., R, Python, etc.). Thus, exemplarily, the input file is computer code based on the shaped provided in FIG. 1d, where a desired shape to be manufactured is shown in broken line, however, the actual manufactured shape is shown in solid line. This input file is the result of historical data and potentially learning from previous AM forming tasks. These two input files (shown in Blocks 102 and 104) are provided to a modeling block in Block 106 to specify the baseline deviation model of the first process (Process A). Using an optimization technique that includes validation of the resulting compensation, the baseline modeling block optimizes the 3D model for the first process (Process A). This change in the 3D model ensures that for the first process (Process A) printing an object defined by the optimized output 3D model will result in minimum deviation from the original object. This optimization is repeated for a class of shapes (e.g., cylinders, cubes, . . . ) as shown in Block 106. The optimization process of Block 106 specifies a new model for each shape in the class that when formed by the AM machine will result in minimum deviation from the desired shape. An example of a compensated shape is provided in FIG. 1e, where the original shape is shown in broken line and the compensated shape is shown in dotted line. The new model for Process A can be expressed as $f_{new,A} = f_A(\text{input},\text{compensation})$, where $f_{new,A}$ is the new compensated model of the original model (Block 102) incorporating the deviation data (compensation data) of Block 104.

The optimization process taking place in Block 106 is a recursive process, as shown in Blocks 108 and 110. In Block 108, a model deviation file is generated based on the input file of Block 104 that if applied to the input file of Block 102 will result in minimization of the deviations from the desired shapes of the input file of Block 102. Application of this model deviation file (Block 108) is tested against the input file of Block 102 according to a predetermined criterion in the decision block of Block 110. The model validation data in block 108 captures the discrepancies between the observed manufactured product, and the computer-aided design model for the shape that is manufactured. The input file: deviation model in block 104 is a computer function, file, or object that describes the predictions of shape deviations for a product that is to be manufactured. The predetermined criterion can be based on an acceptable standard deviation, or other statistical parameters such as least mean squares (which is a statistical approach seeking to minimize the error between a desired shape and the shape in the recursive process), known to a person having ordinary skill in the art.

Once the baseline deviation model for one class of shapes under the first process (Process A) has been optimized, as signified by Block 112, the system 100 of the present disclosure proceeds to the next block. In Block 114, the system 100 uses a transfer function that connects a second process (Process B) to the first process (Process A). The system 100 also uses an input file directed to the deviation model for the second process (Process B), similar to the deviation model for the first process (Process A) shown in Block 104, to develop a new model for the second process (Process B). The transfer function (or otherwise referred to as transfer compensation) is expressed as T=Orig Component$(\Delta_B - f_A(\text{input},\text{compensation}))^2$, wherein $\Delta_B$ is the observed deviation data for products manufactured under process B. The deviation model for process B is generated via this transfer function, as provided in Block 114. With the transfer function of Block 114 and the input file for observed data for new process (Process B) of Block 116 as inputs, the system 100 then proceeds to an adaptive modeling of deviation shown in Block 118 that is similar to the modeling of the baseline deviation of Block 106. Similarly, as discussed above, the optimization process taking place in Block 118 is a recursive process, as shown in Blocks 120 and 122. In Block 120, a model deviation file is generated based on the input file of Block 116 that if applied to the output of the transfer function will result in minimization of the deviations from the desired shapes of the output of the transfer function block 114. Application of this model deviation file (Block 120) is tested against the output of the transfer function 114 according to a predetermined criterion in the decision block of Block 122. The model validation data in block 120 captures the discrepancies between the observed manufactured product, and the output of the transfer function block 114 for the shape that is manufactured. The observed data for the new process is a computer file that describes the shape deviation for a product that is to be manufactured under the new process. The predetermined criterion can be based on an acceptable standard deviation, or other statistical parameters such as least mean squares (which is a statistical approach seeking to minimize the error between a desired shape and the shape in the recursive process), known to a person having ordinary skill in the art. The system 100 then outputs an optimized 3D output model for the new process (Process B).

Once the adaptive deviation model for one class of shapes under the new process (Process B) has been optimized, as signified by Block 124, the system 100 of the present disclosure proceeds to the next block (Block 126), where a compensation plan is generated for going from the first process (Process A) to the second process (Process B) for a variety of shapes, accounting for variations in i) deviations due to changes in the AM machine as well as ii) changes for going from one process to another process. It should be noted that these shapes all belong to a common class, e.g., cylinders with different nominal radii.

Figure 1F:
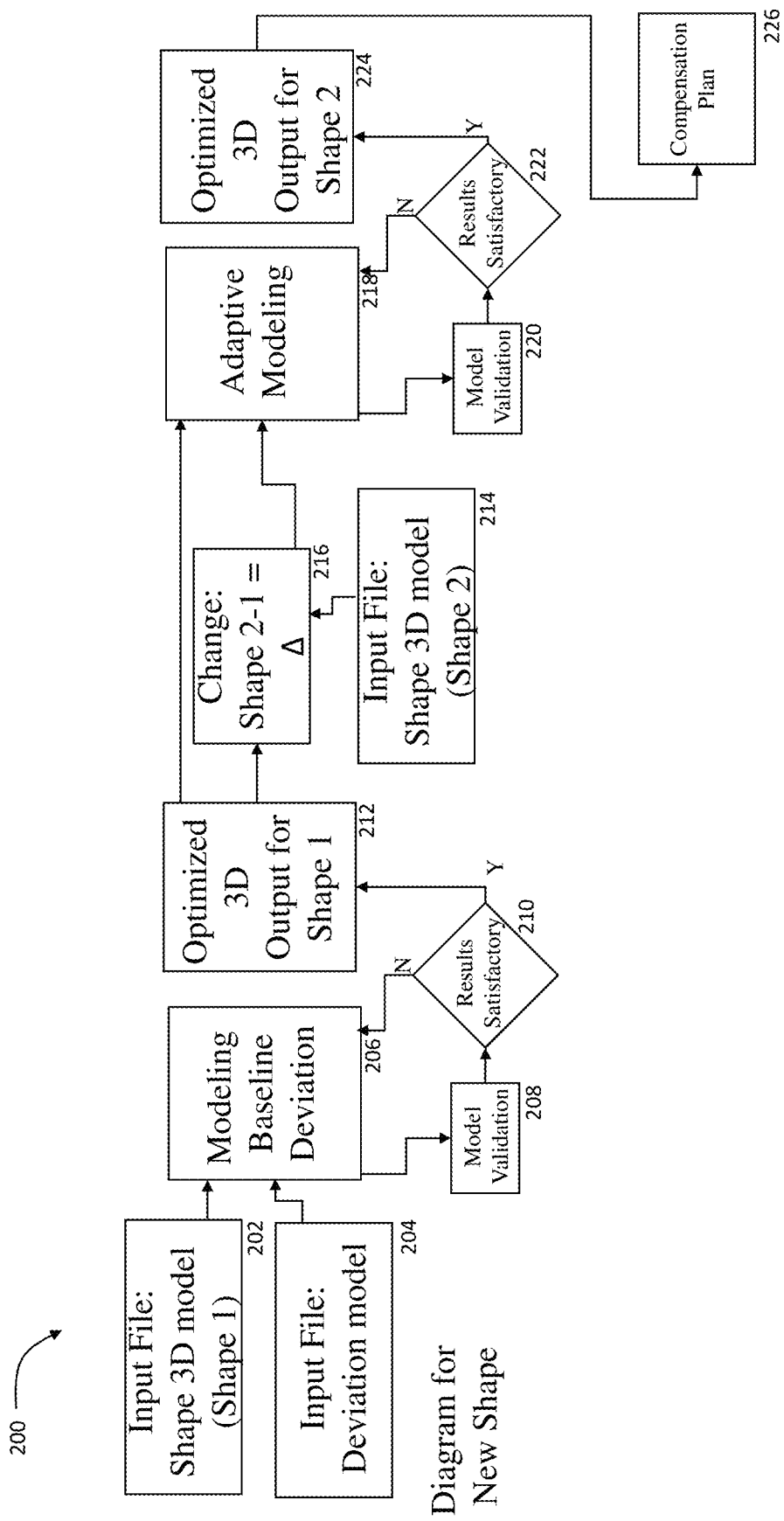
FIG. 1f is a block diagram depicting blocks in a system according to another embodiment of the present disclosure capable of carrying out some of the steps shown in FIGS. 1a and 1b.

Now referring to FIG. 1f, a block diagram for a system 200 for determining an optimized 3D model for a new shape is provided using the same process (Process X). The blocks in system 200 according to the present disclosure provide capability of carrying out some of the steps shown in FIGS. 1a and 1b. In particular, FIG. if provides the steps between flow steps 14 and 16 in FIG. 1a and between flow steps 22 and 24 in FIG. 1b. As such FIG. if is related to changes in the shapes. The goal of system 200 is to calculate an optimized 3D model for a first shape (Shape 1) given a deviation model for the first shape (Shape 1) under the process (Process X) and an optimized 3D model for a second shape (Shape 2) under the same process (Process X). Similar to the system 100 of FIG. 1c, the system 200 of FIG. if starts on the left side by receiving an unoptimized 3D model for a first shape (Shape 1) for the process (Process X), as shown in Block 202. This input file provides a conventional model for the first shape (Shape 1) for a particular AM process (Process X). For example, a cylindrical shape may be presented as stacks of 2D circles formed (or, in the case of a 3D printer, printed) vertically to form the cylinder. The input file in Block 202 then is a representation of a circle. The system 200 also provides an input file in Block 204 directed to the deviation model for the first shape (Shape 1) for the process (Process X). This input file in Block 204 is generally constructed to capture deviation of the AM machine over a period of time. In particular, an AM machine may begin its life forming parts with some deviations. In addition, the AM machine thereafter may introduce additional deviations due to wear. The input file in Block 204 provides a model for such deviations (i.e., initial and time-dependent variations) from the desired shape (Shape 1) based on measurements of the parts formed by the AM machine (data based on measurements, not shown, is implicitly included in Blocks 202 and 204). For example, with respect to various boundaries, the input file in Block 204 defines the manufacturing quality (i.e., deviation), both in-plane and out-of-plane, with respect to the demanded output for the process (Process X) for the first shape (Shape 1). An example of this input file is one that contains computer code for the general statistical model that can be fit given the data by executing the code in a particular programming language (e.g., R, Python, etc.). Thus, exemplarily, the input file is computer code based on the shapes provided in FIG. 1d, where as discussed above a desired shape to be manufactured is shown in broken line, however, the actual manufactured shape is shown in solid line. This input file is the result of historical data and potential learning from previous AM tasks. These two input files (shown in Blocks 202 and 204) are provided to a modeling block in Block 206 to specify the baseline deviation model of the first shape (Shape 1). Using an optimization technique that includes validation of the resulting compensation, the baseline modeling block optimizes the 3D model for the first shape (Shape 1). This change in the 3D model ensures that for the first shape (Shape 1), manufacturing an object defined by the optimized output 3D model will result in minimum deviation from the original object. The optimization process of Block 206 specifies a new model for the first shape (Shape 1) that, when formed by the AM machine, will result in minimum deviation from the desired shape (Shape 1). An example of a compensated shape is provided in FIG. 1e, where the original shape is shown in broken line and the compensated shape is shown in dotted line. The new model for Shape 1 can be expressed as $f_{new,A}=f_A$(input, compensation), where $f_{new,A}$ is the new compensated model of the original model (Block 202) incorporating the deviation data (compensation data) of Block 204.

The optimization process taking place in Block 206 is a recursive process, as shown in Blocks 208 and 210. In Block 208, a model deviation file is generated based on the input file of Block 204 that, if applied to the input file of Block 202, will result in minimization of the deviations from the desired shapes of the input file of Block 202. Application of this model deviation file (Block 208) is tested against the input file of Block 202 according to a predetermined criterion in the decision block of Block 210. The model validation data in Block 208 captures the discrepancies between the observed, manufactured product, and the computer-aided design model for the shape that is to be manufactured. The input file: deviation model in block 204 is a computer function, file, or object that describes the predictions of shape deviations for a product that is to be manufactured. The predetermined criterion can be based on an acceptable standard deviation, or other statistical parameters such as least mean squares (which as discussed above is a statistical method seeking to minimize the error between a desired shape and the shape in the recursive process), known to a person having ordinary skill in the art.

Once the baseline deviation model for the first shape (Shape 1) under the process (Process X) has been optimized—thus, implicitly including the baseline deviation model, as signified by Block 212, the system 200 of the present disclosure proceeds to the next block. In Block 214, the system 200 uses an unoptimized 3D model of a second shape (Shape 2) for the process (Process X). This input file, similar to the input file of Block 202, provides a conventional model for the second shape (Shape 2) for the process (Process X). For example, a cube may be presented as stacks of 2D squares formed (or, in case of a 3D printer, printed) vertically to form the cube. The input file in Block 214 then is a representation of a square. Utilizing the input file of Block 214, the system 200 then determines a difference model between the first shape (Shape 1), e.g., a circle, and the second shape (Shape 2), e.g., a square, as shown in Block 216 for the process (Process X). This model (output of Block 216) and the output of Block 212 (optimized model for the first shape (Shape 1)) are then fed to an adaptive modeling block of Block 218 in order to generate the model for the second shape (Shape 2) as the system 200 proceeds to Block 218 which is similar to the modeling of the baseline deviation of Block 206. Similarly, as discussed above, the optimization process taking place in Block 218 is a recursive process, as shown in Blocks 220 and 222. In Block 220, a model deviation file is generated based on the input file of Block 214 that if applied to the changed input file of Block 212 (i.e., the input files of Blocks 212 and 214 changed by the difference model of Block 216) will result in minimization of the deviations from the desired shapes of the input file of Block 214. Block 216 captures the difference between the observed deviation data for the new shape (Shape 2) and the predictions for the first shape (Shape 1); and this difference is referred to herein as the delta function. It should be noted that block 220 captures the difference between the predictions for the new shape (Shape 2) and the observed data for the new shape (Shape 2). Application of this model deviation file (Block 220) is tested against the changed version of input files of Blocks 212 and 214 according to a predetermined criterion in the decision block of Block 222. The predetermined criterion can be based on an acceptable standard deviation, or other statistical parameters such as least mean squares (which as discussed above is a statistical method seeking to minimize the error between a desired shape and the shape in the recursive process), known to a person having ordinary skill in the art. The new model then outputs an optimized 3D output model for the second shape (Shape 2) under the process (Process X).

Once the adaptive deviation model for the second shape (Shape 2) under the process (Process X) has been optimized, as signified by Block 224, the system 200 of the present disclosure proceeds to the next block (Block 226), where a compensation plan is generated for going from the first shape (Shape 1) to the second shape (Shape 2) for the process (Process X), accounting for variations in i) deviations due to changes in the AM machine as well as ii) changes for going from one shape to another shape.

In both FIGS. 1c and 1f (i.e., systems 100 and 200 for new process and new shape, respectively), the output includes an optimized 3D output for the new process, an optimized 3D output for the new shape, and the corresponding compensation plan that will yield minimum deviation in either case.

A combination of FIGS. 1c and 1f, while not shown, can provide the basis for FIG. 1a (i.e., old-process-to-new-process-to-new-shape). To that end, the output of Block 124 (see FIG. 1c) can be used as inputs to block 216 and 218 as an optimized 3D output for a new process (Process B) to be used for a new Shape (Shape 2). The remainder of FIG. 1f remains the same.

Figure 1G:
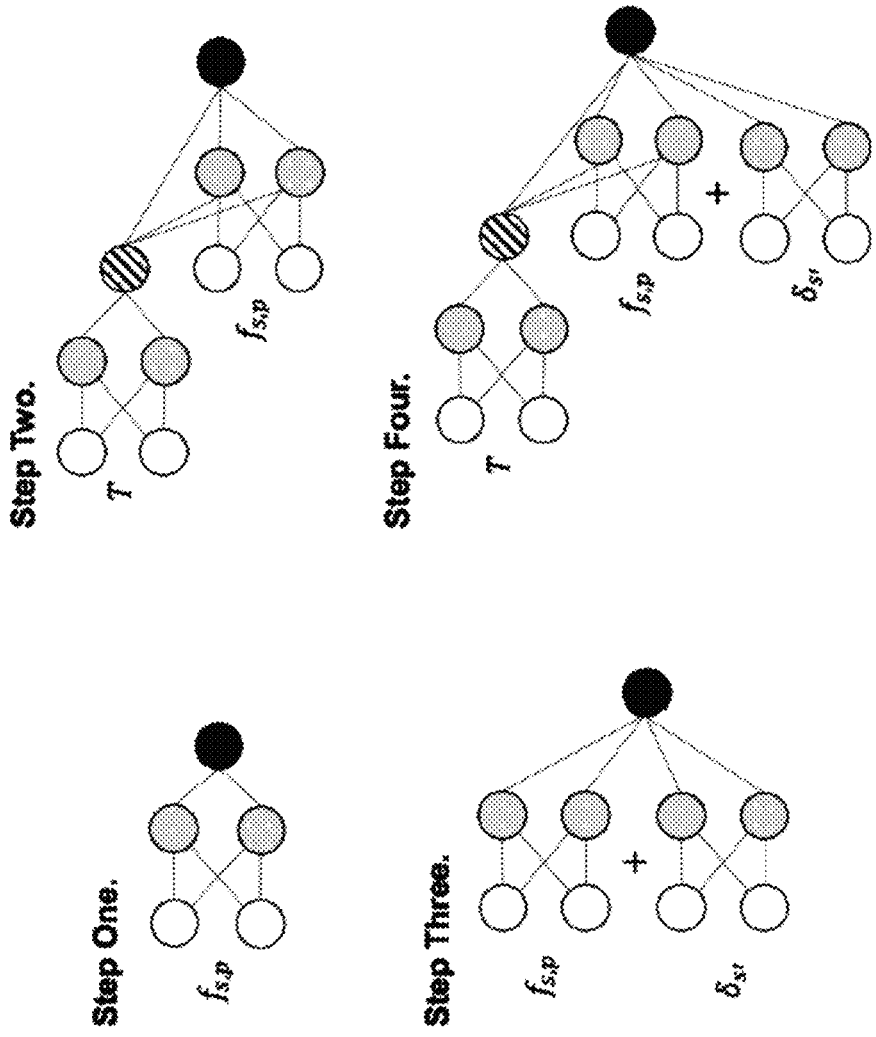
FIG. 1g is a schematic depicting steps associated with a Bayesian extreme learning machines (ELM) used in optimization of steps in FIGS. 1c and 1f.
Figure 1G:

As discussed above, the optimization techniques described above include a variety of different techniques known to a person having ordinary skill in the art. Examples include least means squares and a class of Bayesian extreme learning machines (ELMs). According to one embodiment, the methodology described in the present disclosure utilizes point cloud measurement data collected from a small sample of test shapes without requiring specific knowledge of AM processes. The optimization method described herein advantageously meet the stated goal of automated specification of both in-plane and out-of-plane deviation models for different shapes under a specific process and/or same shapes under multiple processes, and to do so with increased simplicity. Referring to FIG. 1g, steps associated with the Bayesian ELM discussed herein are provided. In Step 1, the baseline deviation model $f_{s,p}$ for a class of shapes s manufactured under an AM process p is defined as $$y_{s,p}=x_{s,p}+H_{s,p}\beta_{s,p}+\epsilon_{s,p}$$

where $y_{s,p}$ contains the observed deviations, $x_{s,p}$ contains the compensations for each point, $\beta_{s,p}$ contains the parameters to be estimated, $\epsilon_{s,p}$ contains the random error (i.e., random variables representing high-frequency deviation components), and $H_{s,p}$ is a function of the inputs defined as the $N_{s,p} \times M_{s,p' \to p}$ matrix whose $(i,m)$ entry is $g(\alpha_{0,m}^{(s,p')}+z_i(\theta_i,r_{l_i}^{nom}(\cdot),x_{l_i}(\theta_i))^T \alpha_m^{(s,p')})$ for a certain activation function g.

In step 2 of FIG. 1g, the total equivalent amount for the change in the process is $$\hat{T}_{s,p' \to p}=H_{s,p' \to p}\beta_{s,p' \to p}+\epsilon_{s,p' \to p},$$

where the deviation model for the new process is expressed as $$y_{s,p'} = x_{s,p} + H_{s,p' \to p} \hat{\beta}_{s,p' \to p} + H_{s,p} \beta_{s,p} + \epsilon_{s,p'}.$$

Next in Step 3 of FIG. 1g, the deviation model for the new shape can be expressed by:

$$y_{s',p} = x_{s,p} + H_{s',p,G} \beta_{s,p} + H_{s',p,L} \beta_{s',p} + \epsilon_{s',p}$$

with the local deviation feature denoted by $\delta_{s'} = H_{s',p,L} \beta_{s',p}$.

Finally, in Step 4 of FIG. 1g, the deviation model for a new shape under a new process can be expressed by $$y_{s',p'} = x_{s,p} + H_{s,p' \to p,G} \hat{\beta}_{s,p' \to p} + H_{s',p',G} \beta_{s,p} + H_{s',p,L} \beta_{s',p} + \epsilon_{s',p'}.$$

Figure 2B:
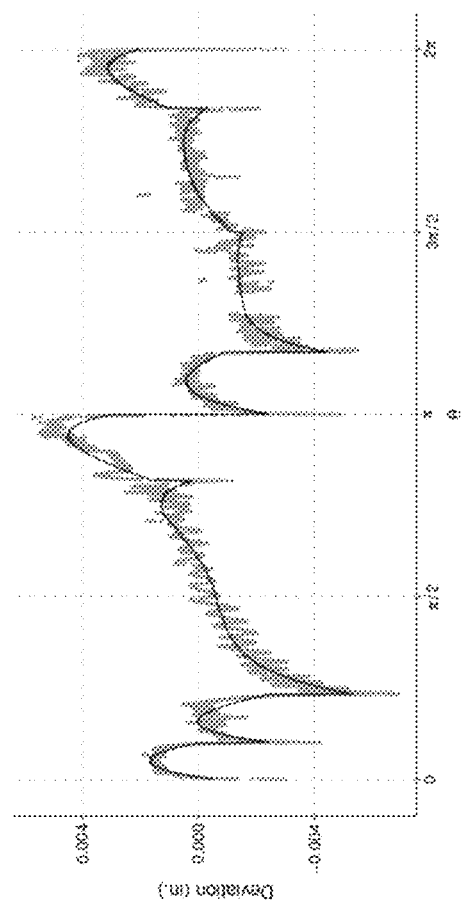
FIG. 2b is a graph of deviation (in inches) vs. angles (in radians) that shows the deviation model fit obtained from the method of the present disclosure.
Figure 2A:
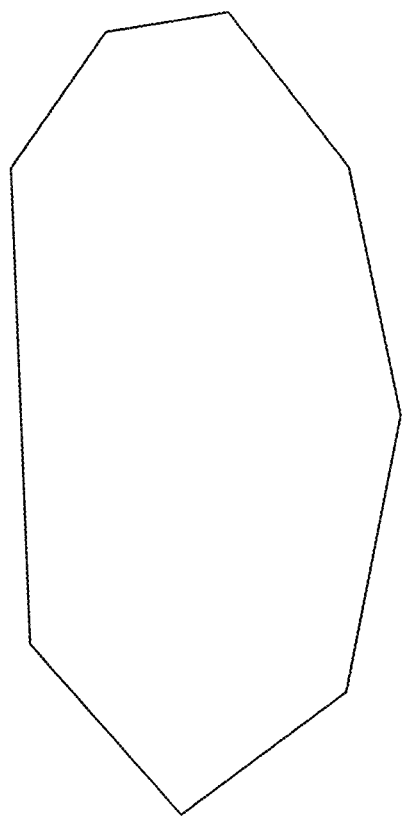
FIG. 2a is a schematic showing modeling of in-plane deviations for an irregular polygon based only on data and models for different radii cylinders and a single regular pentagon under a stereolithography process.

To demonstrate this approach, a case study is presented herein based on modeling in-plane deviations for an irregular polygon shown in FIG. 2a based only on data and models for different radii cylinders and a single regular pentagon under a stereolithography process. FIG. 2b is a graph of deviation in inches vs. angles (in radians) that shows the deviation model fit obtained from the method of the present disclosure. The gray curve represents shape deviations and the black line curve represents model output of the present disclosure. By inspection, the method described herein yields a model with excellent fit characteristics as compared to actual measurements based on a comparison to the irregular polygon.

Figure 3:
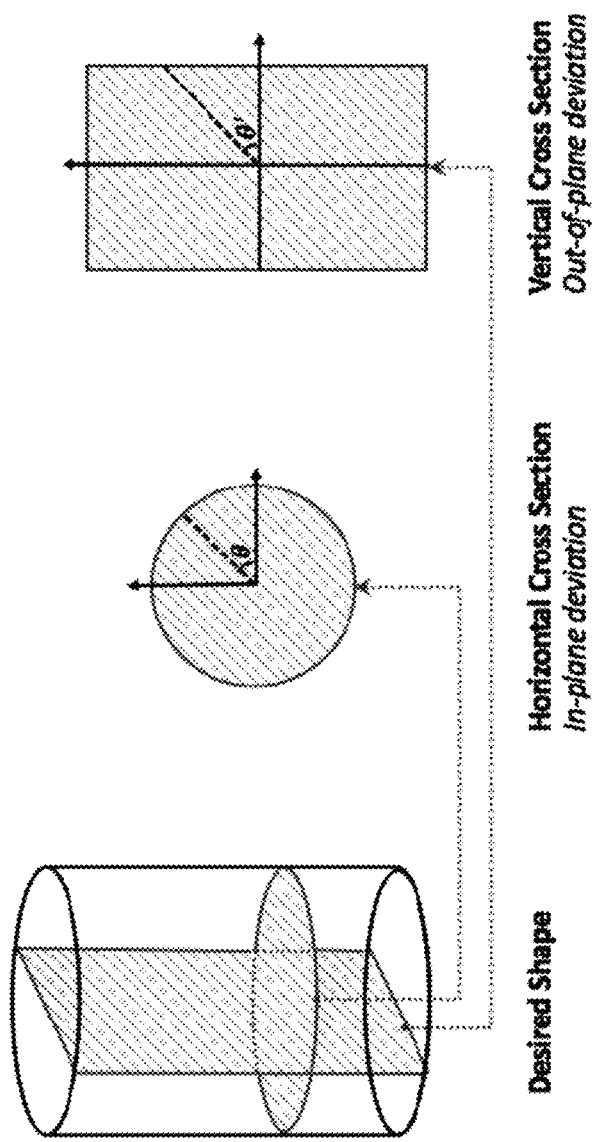
FIG. 3 shows schematics of deviations in different directions, including in-plane deviations based on deviations in a cross-section of a shape (e.g., a circle as a cross-section of a cylinder) and out-of-plane deviations that refer to the deviations in the vertical direction of a 3D shape with non-negligible height.

In the present disclosure, in-plane deviations refer to 2D deviations of a 3D shape with a negligible vertical height. For such a shape, the top and bottom surface deviations are about the same. A polar coordinates representation of the in-plane deviation is shown in FIG. 3, which shows the deviations in different directions. Out-of-plane deviations refer to the deviations in the vertical direction of a 3D shape with non-negligible heights. For objects that have negligible lengths or widths, a polar coordinate transformation can also be used to represent out-of-plane deviations.

The methodology used in the present disclosure is based on in-plane deviations of shapes with negligible heights, and out-of-plane deviations of shapes with negligible widths. In both cases, each point on a product is identified by an angle $\theta$. The nominal radius function for a manufactured product 1 is the function $r_l^{nom}:[0,2\pi] \to \mathbb{R}$ that defines a computer model. For a point $\theta$ on a product (denoted as 1), the radius is denoted by $r_l^{obs}(\theta)$, and its deviation is defined as $\Delta_l(\theta) = r_l^{obs}(\theta)$. This representation enables consistent in-plane and out-of-plane deviation modeling. The compensation plan $x_l(\bullet)$ for a product 1, according to one embodiment of the present disclosure is a function $x_l:[0;2\pi] \to \mathbb{R}$ that specifies the addition and subtraction of material based on original computer model. The observed radius for point $\theta$ on product 1 under compensation plan $x_l(\bullet)$ is denoted by $r_l^{obs}(\theta, x_l(\theta))$, and the corresponding deviation is $\Delta_l(\theta, x_l(\theta)) = r_l^{obs}(\theta, x_l(\theta)) - r_l^{nom}(\theta)$.

In order to show the applicability of the system and method according to the present disclosure, case studies of a Bayesian ELM deviation modeling methodology for different shapes and AM processes are now provided. Initially, implementation of the first step for the baseline shape of cylinders with small heights manufactured under a single setting of a stereolithography machine, as discussed with respect to FIG. 1c, is provided. The second step of the methodology according to the present disclosure is then discussed with respect to distinct processes including cylinders with small heights manufactured under a different setting, circular cavities in cylinders with small heights, and out-of-plane deviations for vertical semi-cylinders. The third step of the methodology of the present disclosure is implemented for the case of squares with small heights manufactured under the setting of the prior trial. The fourth step of the methodology according to the present disclosure is implemented for new polygons and free-form shapes, all of which have small heights, under the setting of the prior trial. According to the present disclosure, some of the exemplary shapes of manufactured products are provided in FIGS. 4a-4h. Approximately 1000 equally-spaced points from each product are utilized to fit the models, and the activation function is set as the hyperbolic tangent.

In the first case study, we specify a baseline model for in-plane cylinder deviations using four uncompensated cylinders (shape class 1) of nominal radii 0.5", 1", 2", and 3" manufactured under the same stereolithography process (Process A). We have about 4000 points on these products, with the independent variables for each point i defined as $$z_i(\theta_i, r_{l_i}^{nom}(\bullet)) = (\theta_i, r_{l_i}^{nom}(\theta_i))^T.$$

Figure 5:
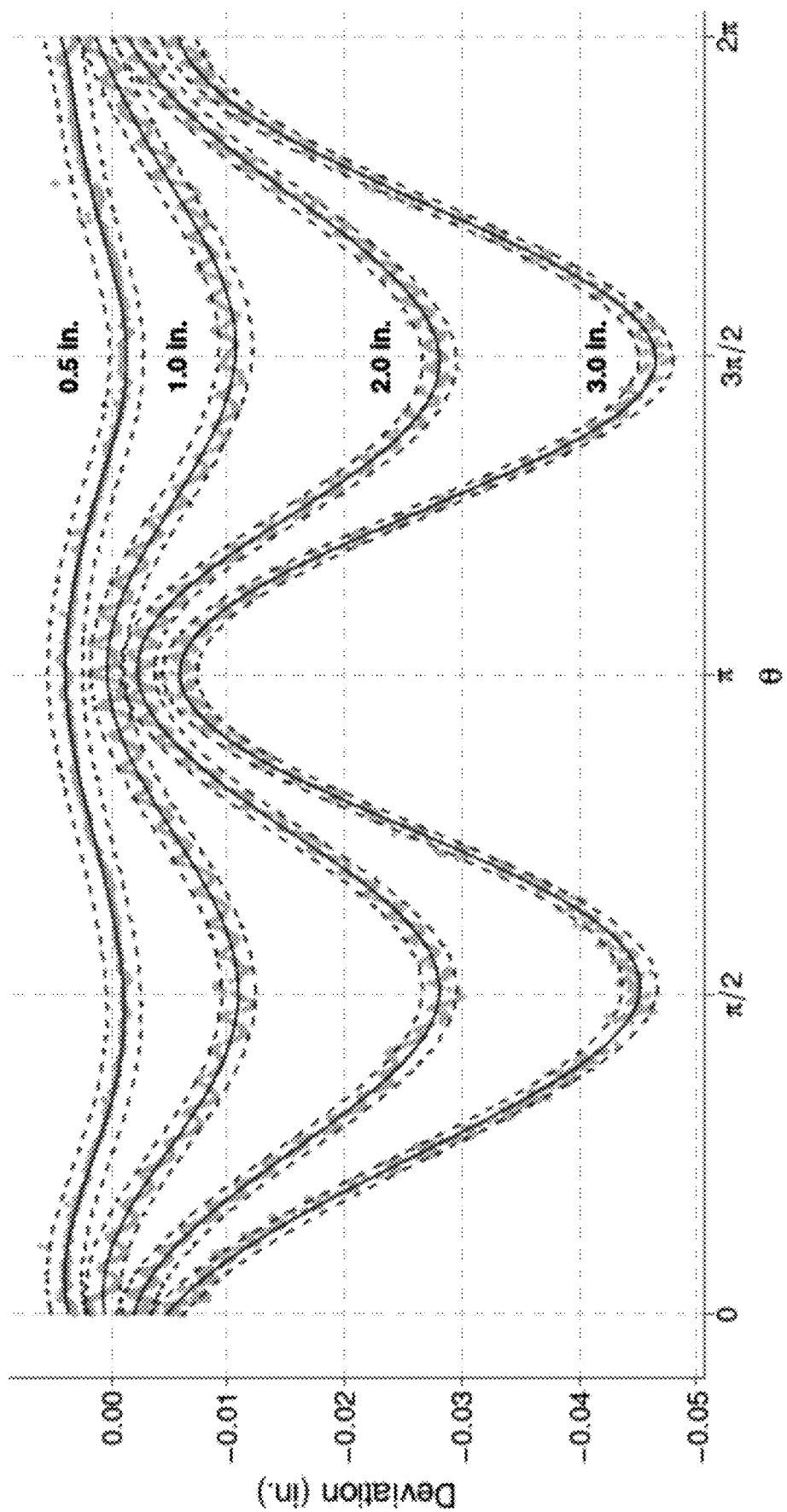
FIG. 5 shows a baseline Bayesian ELM deviation model in which posterior deviation predictions are presented in which a fit (solid line curve) to in-plane cylinder deviations defined by the sum of squared residuals for the model according to the present disclosure are made.

We proceed to fit the baseline Bayesian ELM deviation model. The posterior predictions for deviations from our model are summarized in FIG. 5. By inspection of this figure, we see that the model according to the present disclosure provides a fit to the in-plane cylinder deviations, defined by the sum of squared residuals for our model corresponding to in-plane cylinders being about 0.002. In addition, out of the 4,363 observed deviations, 4,176 are contained in their respective central 95% posterior predictive intervals.

Figure 6:
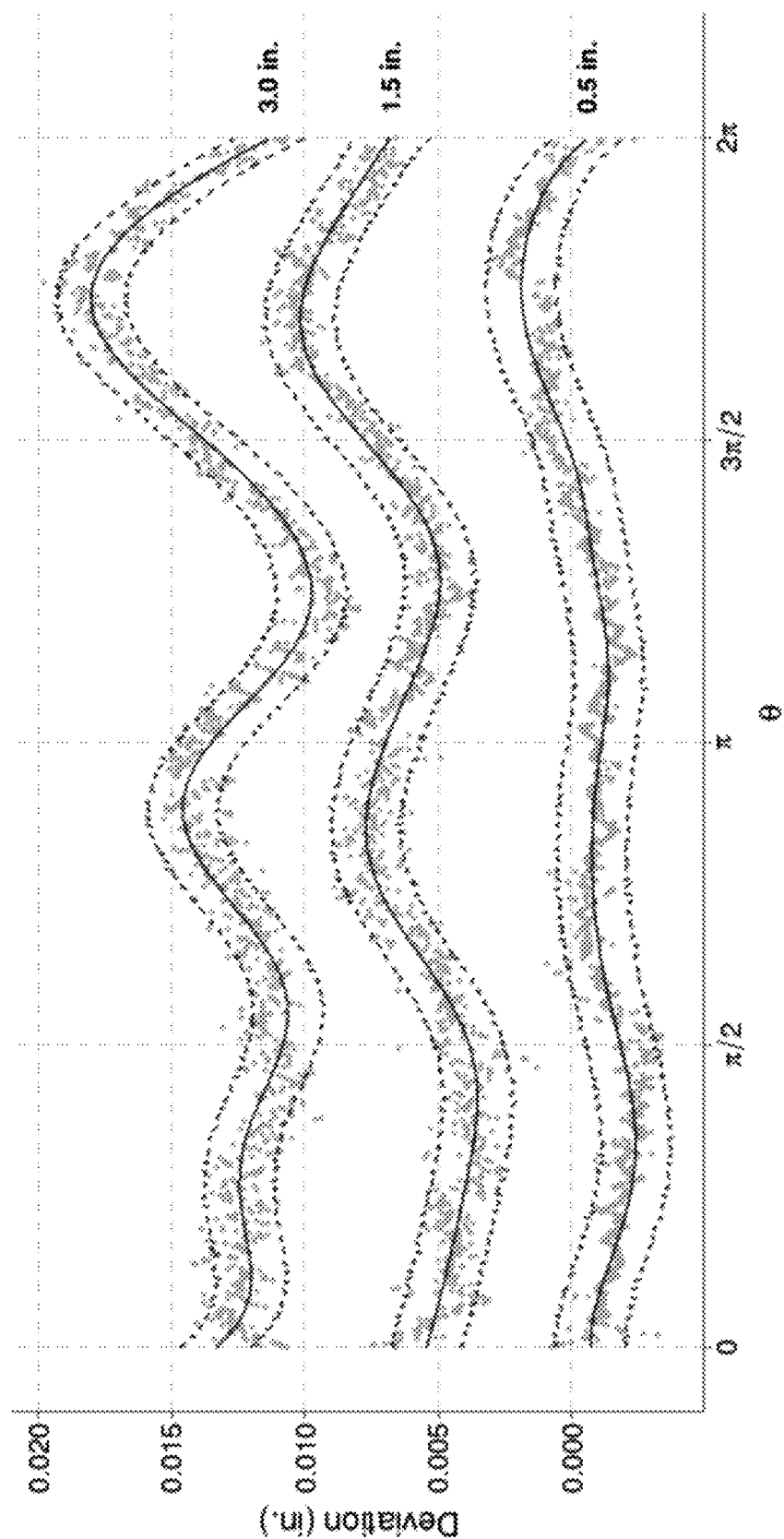
FIG. 6 shows deviations for three cylinders of nominal radii 0.5", 1.5", and 3", and posterior deviation predictions for the cylinders based on fits (solid line curve) made to the in-plane deviations.

Next, in order to model in-plane cylinder deviations under a different setting introduced by a change in the stereolithography calibration, the previously specified baseline deviation model is transferred to cylinders manufactured under a new process (Process B) of the stereolithography machine that introduces overcompensation. The distinct and complicated features of this new process are immediate upon inspection of the deviations in FIG. 6 for three cylinders of nominal radii 0.5", 1.5", and 3" manufactured under it. Specifically, in contrast to the first process (Process A), cylinder deviations under the second process (Process B) increase in magnitude as a function of the nominal radius, and do not exhibit any symmetrical patterns. The second step of our methodology enables automated and rapid deviation modeling of these products. We have about 3000 points on the new products. The summary of our resulting model's posterior predictions in FIG. 6 demonstrates our successful modeling of in-plane cylinder deviations under the second processes (Process B). The products were analyzed in the prior art by way of Bayesian nonlinear regression models. The approach described herein is more advantageous than the results provided in the prior art because it greatly reduces the time and effort for learning and fitting the model.

Figure 7:
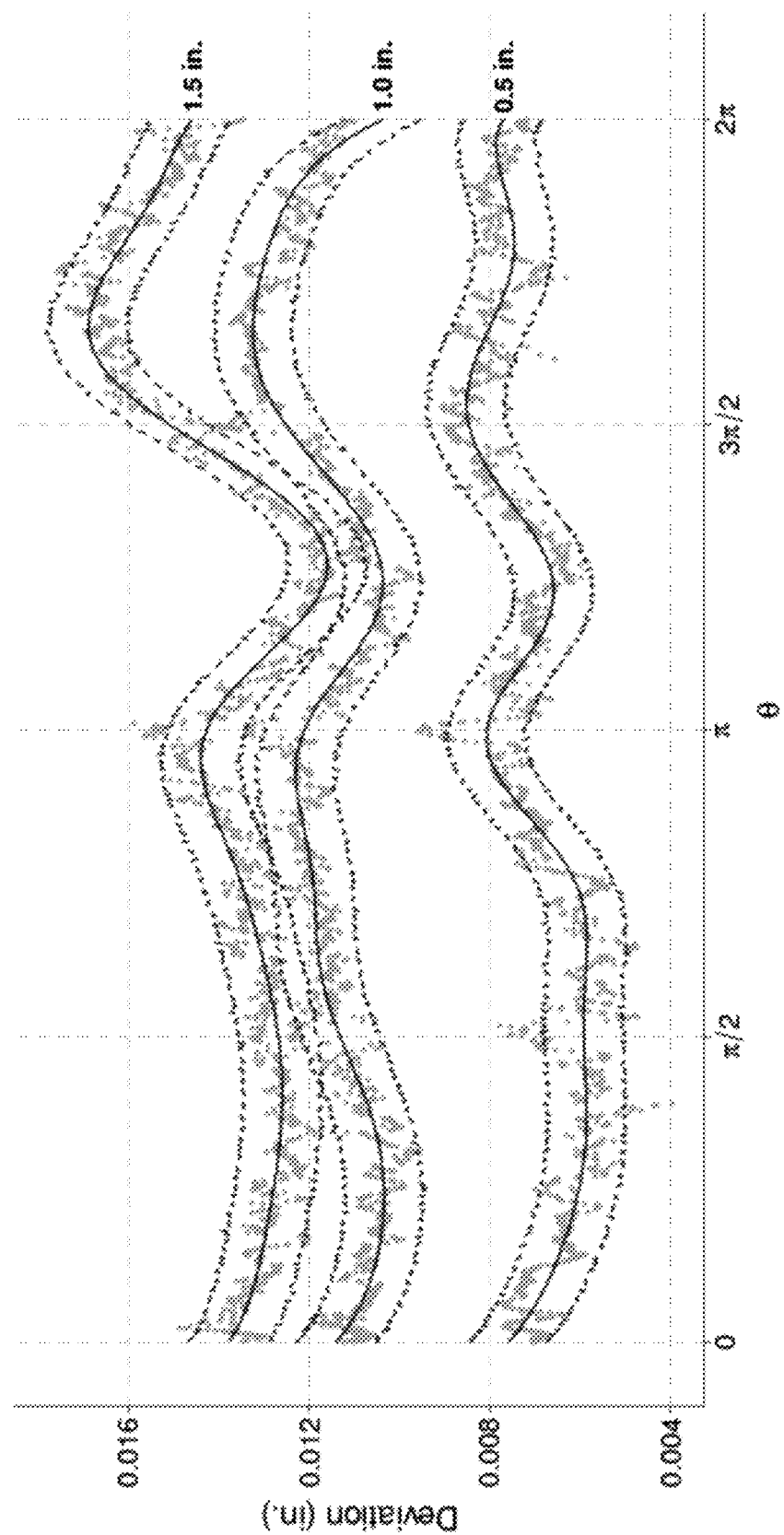
FIG. 7 are in-plane deviations (dots) for three circular cavities and the posterior predictive mean trends (solid lines) and 95% central posterior predictive intervals (dashed lines) obtained by the transfer of the baseline deviation model, according to the present disclosure.
Figure 8A:
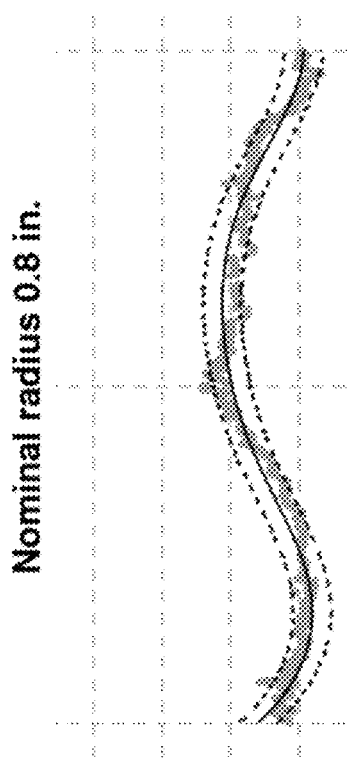
FIGS. 8a, 8b, 8c, and 8d are out-of-plane deviations (dots) for four vertical semi-cylinders, and the posterior predictive mean trends (solid lines) and 95% central posterior predictive intervals (dashed lines) obtained by the transfer of the baseline deviation model, according to the present disclosure.
Figure 8B:
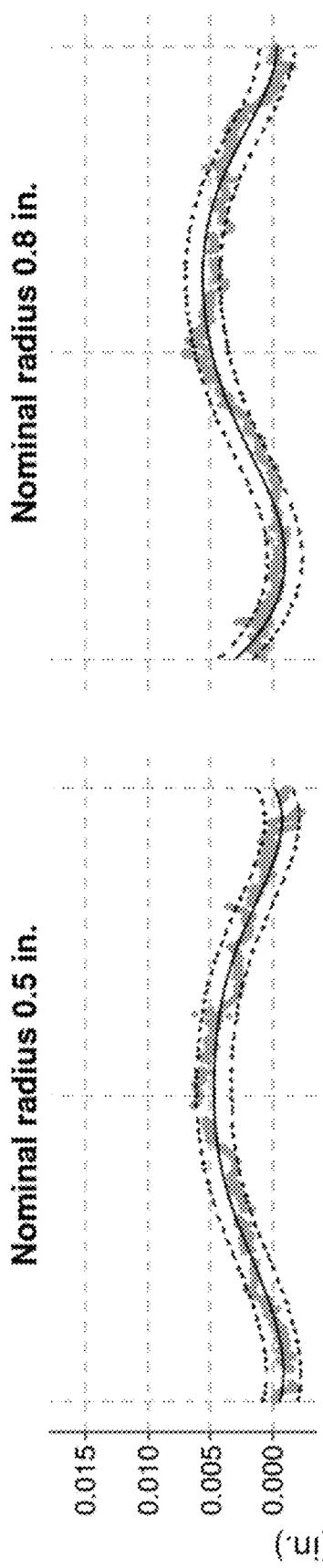
Figure 8C:
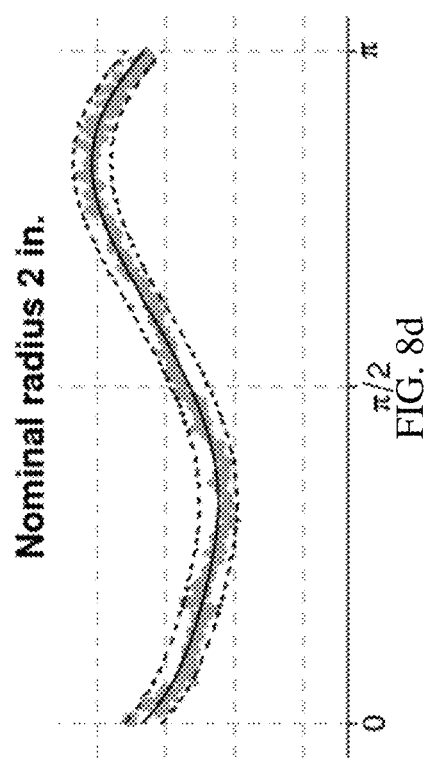
Figure 8D:
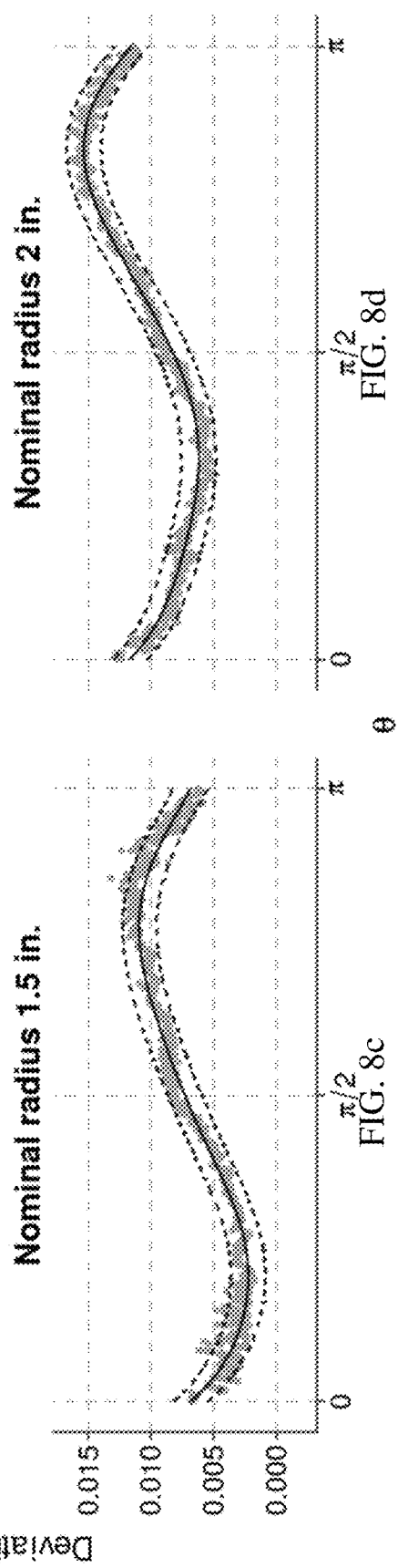

Next, in-plane deviations of circular cavities are examined. The deviations of cavities in additively manufactured products are effectively generated under a new type of AM process C, thus the second step of our methodology can enable deviation modeling for such components of a product. We illustrate this using three circular cavities of nominal radii 0.5", 1.0", and 1.5" contained in cylinders of nominal radii 1", 2", and 3", respectively. We have about 3000 points on these products. The posterior predictions obtained for these products, summarized in FIG. 7, indicate that our model performs well fitting this data. FIG. 7 represents in-plane deviations (dots) for three circular cavities and the posterior predictive mean trends (solid lines) and 95% central posterior predictive intervals (dashed lines) obtained by the transfer of the baseline deviation model. The important consequence of this case study is that we can comprehensively model multiple cavity and boundary components in geometrically complex products in an automated and rapid manner.

Next out-of-plane deviations of vertical semi-cylinders are studied. Out-of-plane deviations are also generated under a new type of AM process D in comparison to in-plane deviations provided in the prior art. Specifying out-of-plane deviation models is of great importance for AM and is especially challenging due to the complications introduced by interlayer bonding effects that exist in the vertical direction of a 3D product. Once again, we address this challenge in deviation modeling by means of the second step of our methodology. To illustrate, we consider four vertical semi-cylinders of nominal radii 0.5", 0.8", 1.5", and 2". We have about 4000 measurements on the product. FIGS. 8a, 8b, 8c, and 8d summarize the posterior predictions obtained from our transfer of the baseline in-plane cylinder deviation model to these products. These figures in particular show out-of-plane deviations (dots) for four vertical semi-cylinders, and the posterior predictive mean trends (solid lines) and 95% central posterior predictive intervals (dashed lines) obtained by our transfer of the baseline deviation model. In contrast to the analysis found in the prior art based on nonlinear regression models, our approach has the advantage of enabling the automated and rapid specification of a deviation model with good predictive performance.

Figure 9:
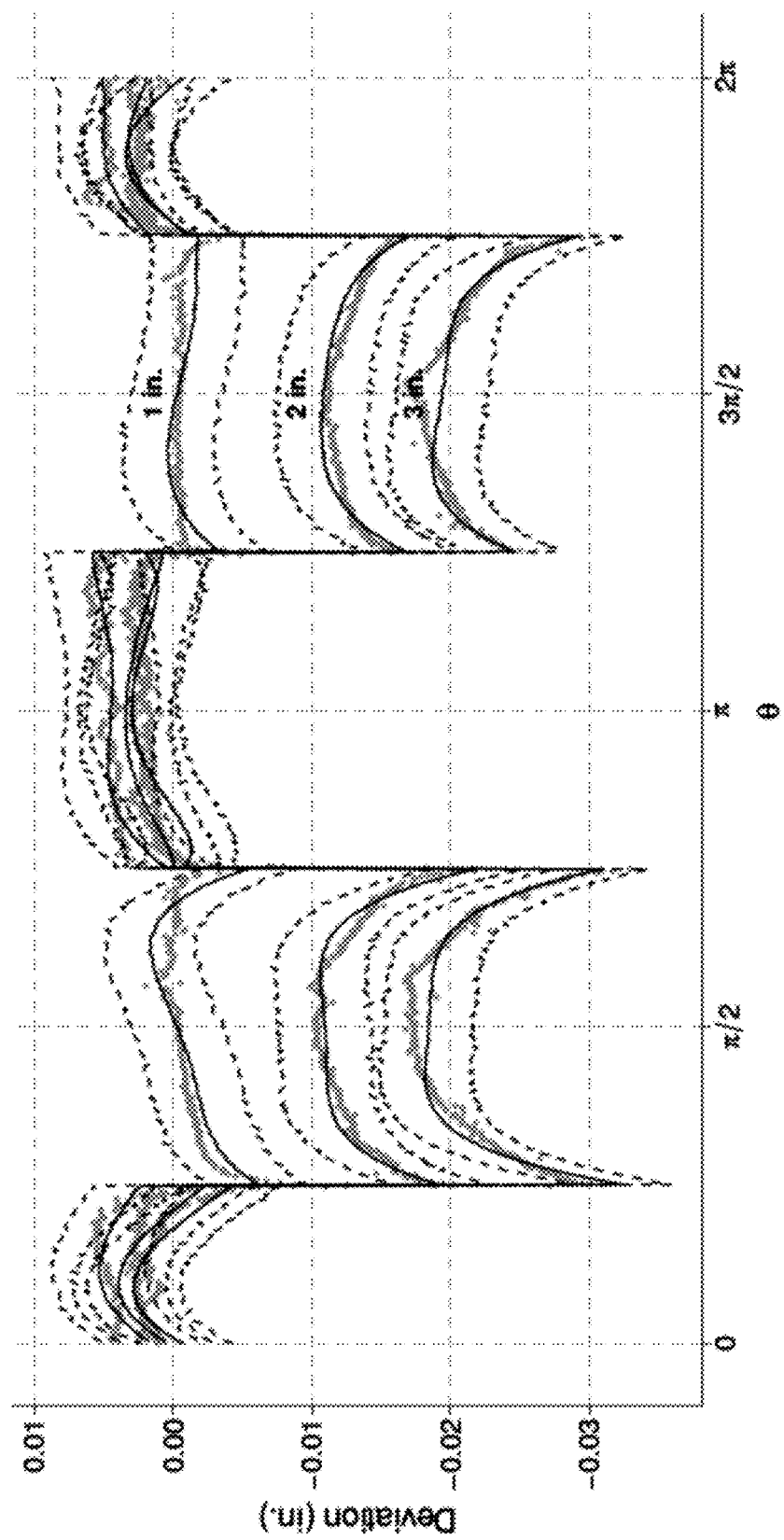
FIG. 9 provides in-plane deviations (dots) for three squares, and the posterior predictive means (solid lines) and 95% central posterior predictive intervals (dashed lines) obtained by the transfer of the cylinder deviation model to these polygons, according to the present disclosure.
Figure 10A:
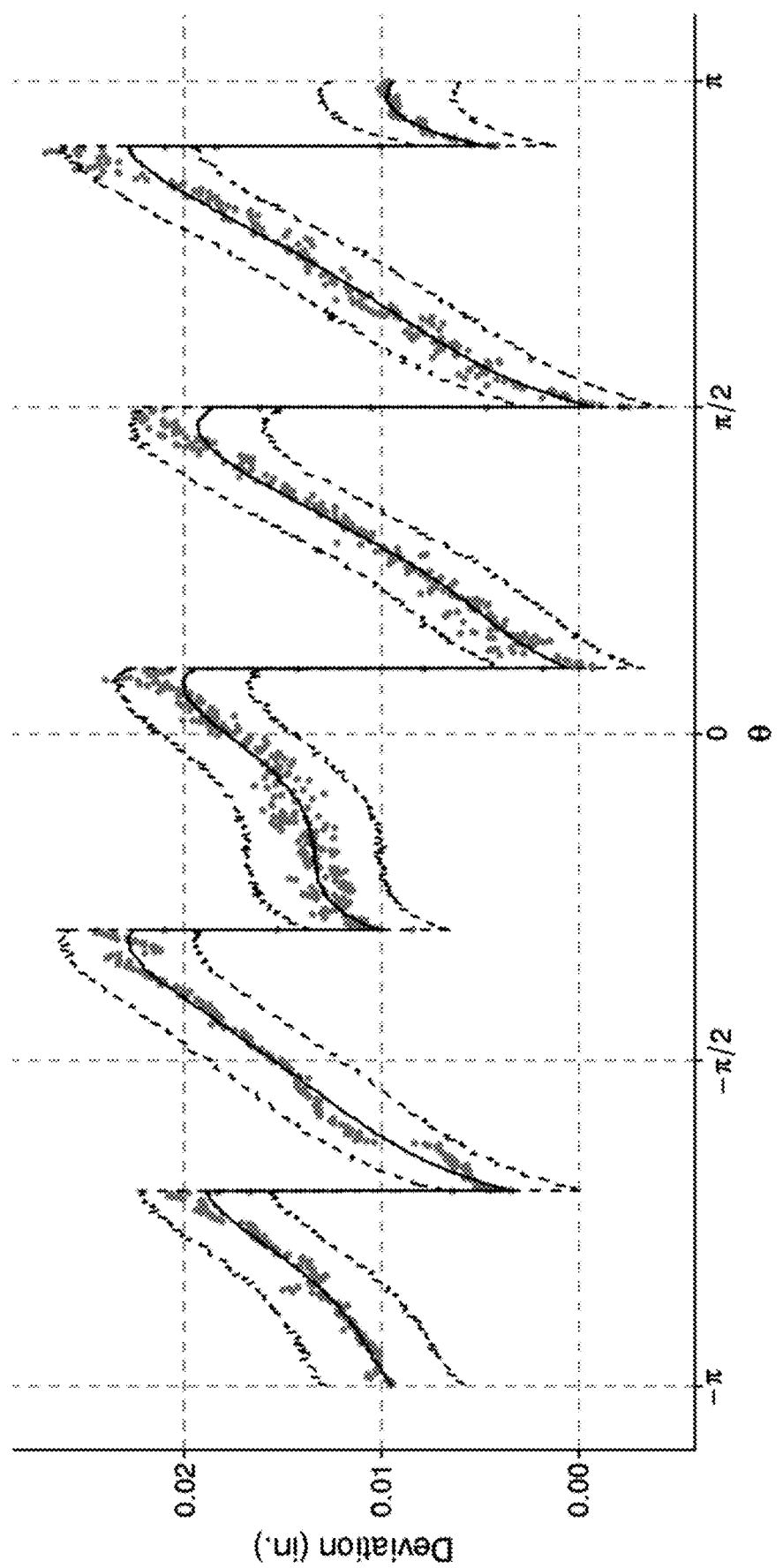
FIGS. 10a, 10b, 10c, and 10d are, respectively, in-plane deviations (dots) under one process for a regular pentagon (FIG. 10a) and dodecagon (FIG. 10b) of size 3", and an irregular polygon (FIG. 10c) with smallest bounding circle of radius 1" as provided in FIG. 2a, and a hexagonal cavity (FIG. 10d) under another process.
Figure 10B:
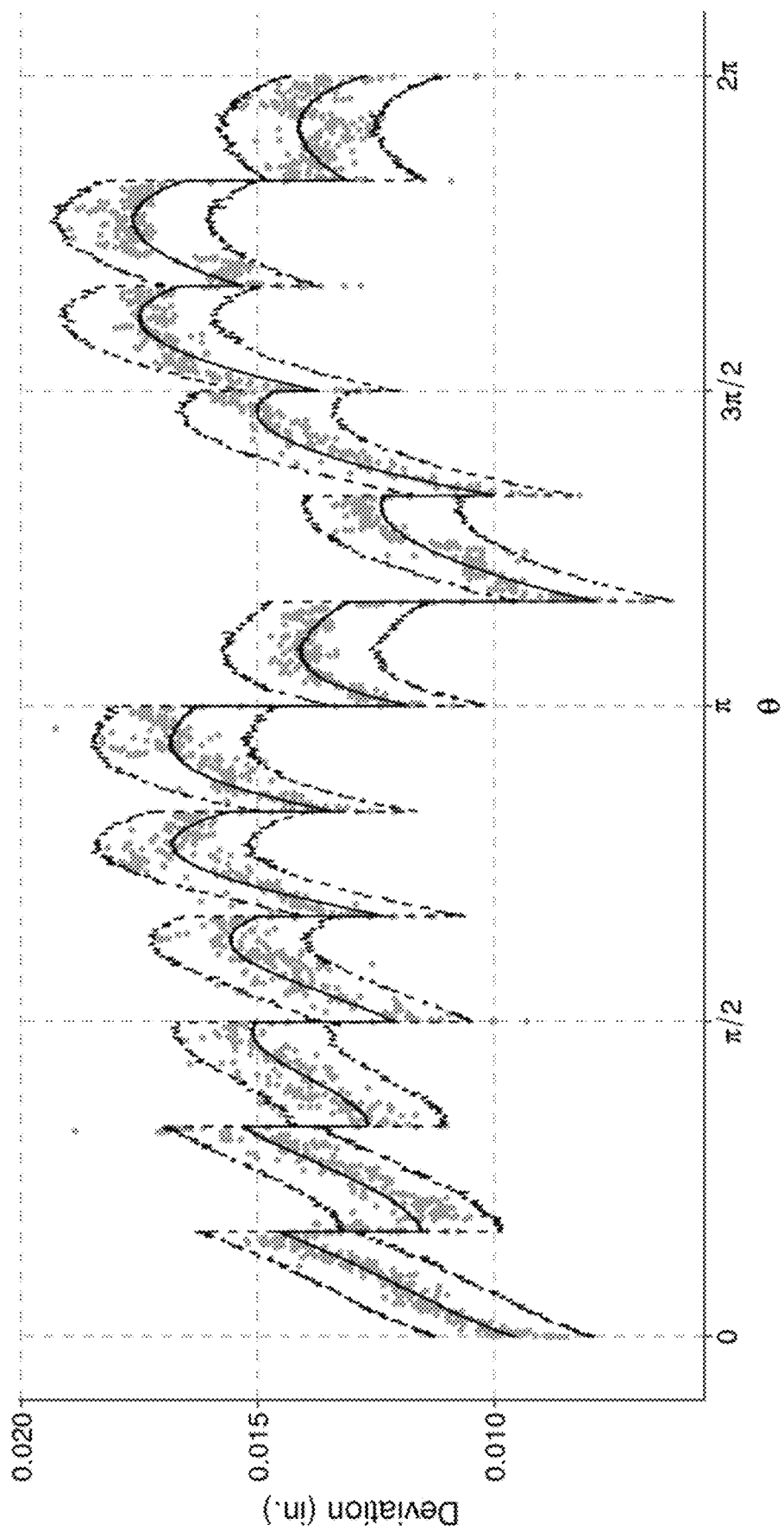
Figure 10C:
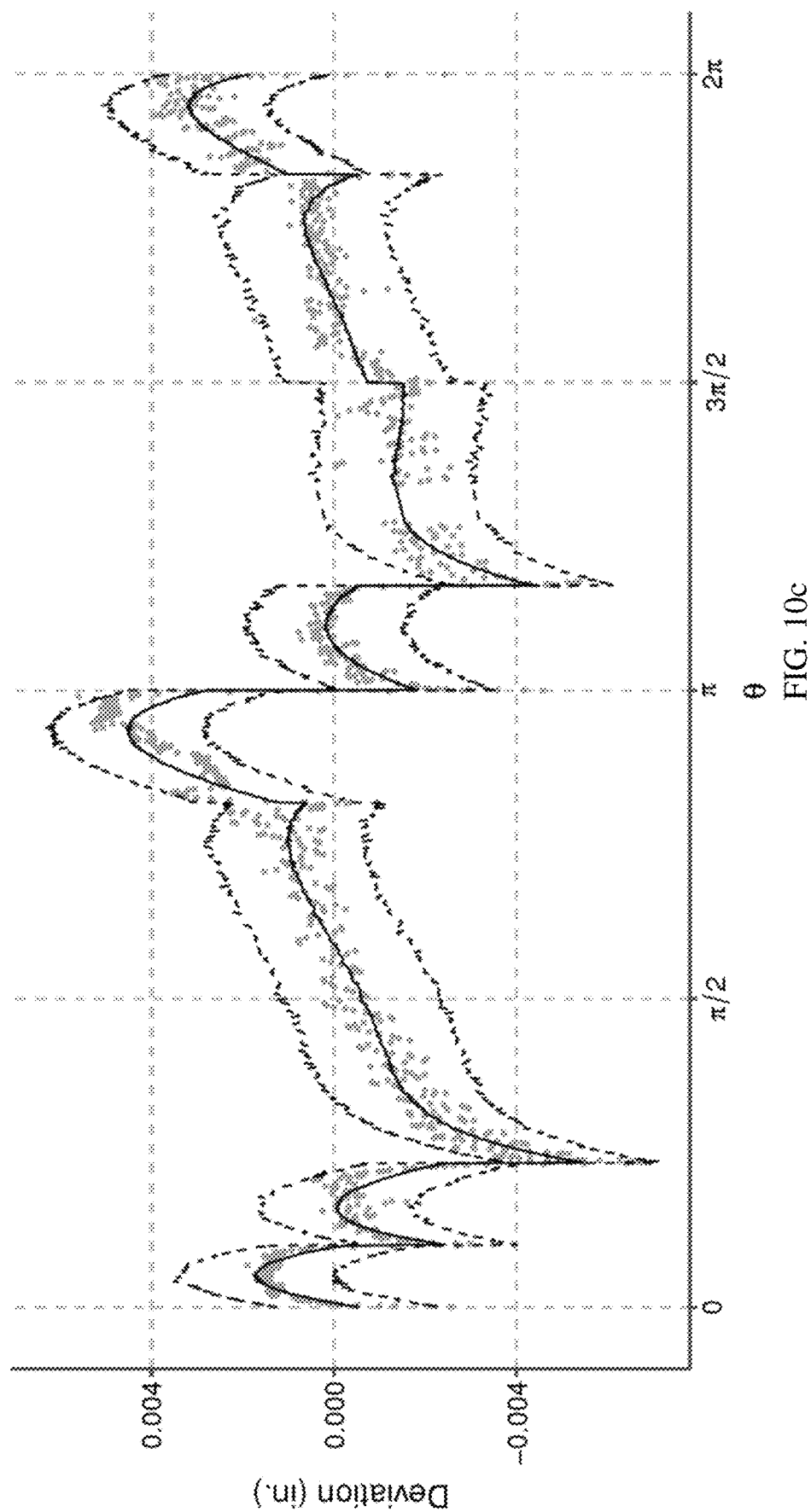

Next, results from transferring the baseline cylinder model to new shapes and processes are discussed. The in-plane deviations of polygons under a process are first examined. First, results from in-plane deviations (dots) for three squares, and the posterior predictive means (solid lines) and 95% central posterior predictive intervals (dashed lines) obtained by our transfer of the cylinder deviation model to these polygons are presented in FIG. 9. Next, we consider in-plane deviations of a regular pentagon and dodecagon of size 3", and the irregular polygon with smallest bounding circle of radius 1" (see FIG. 2a), all of which were manufactured under Process B. In-plane deviations (dots) for these polygons, their posterior predictive mean trends (solid lines), and 95% central posterior predictive intervals (dashed lines) are shown for Process B in FIGS. 10a, 10b, and 10c for the regular pentagon, regular dodecagon, and irregular polygon, respectively. The combination of the connectable ELM structures that were learned in our previous steps enable us to specify and fit deviation models for these products in a much more automated and rapid manner.

Figure 10D:
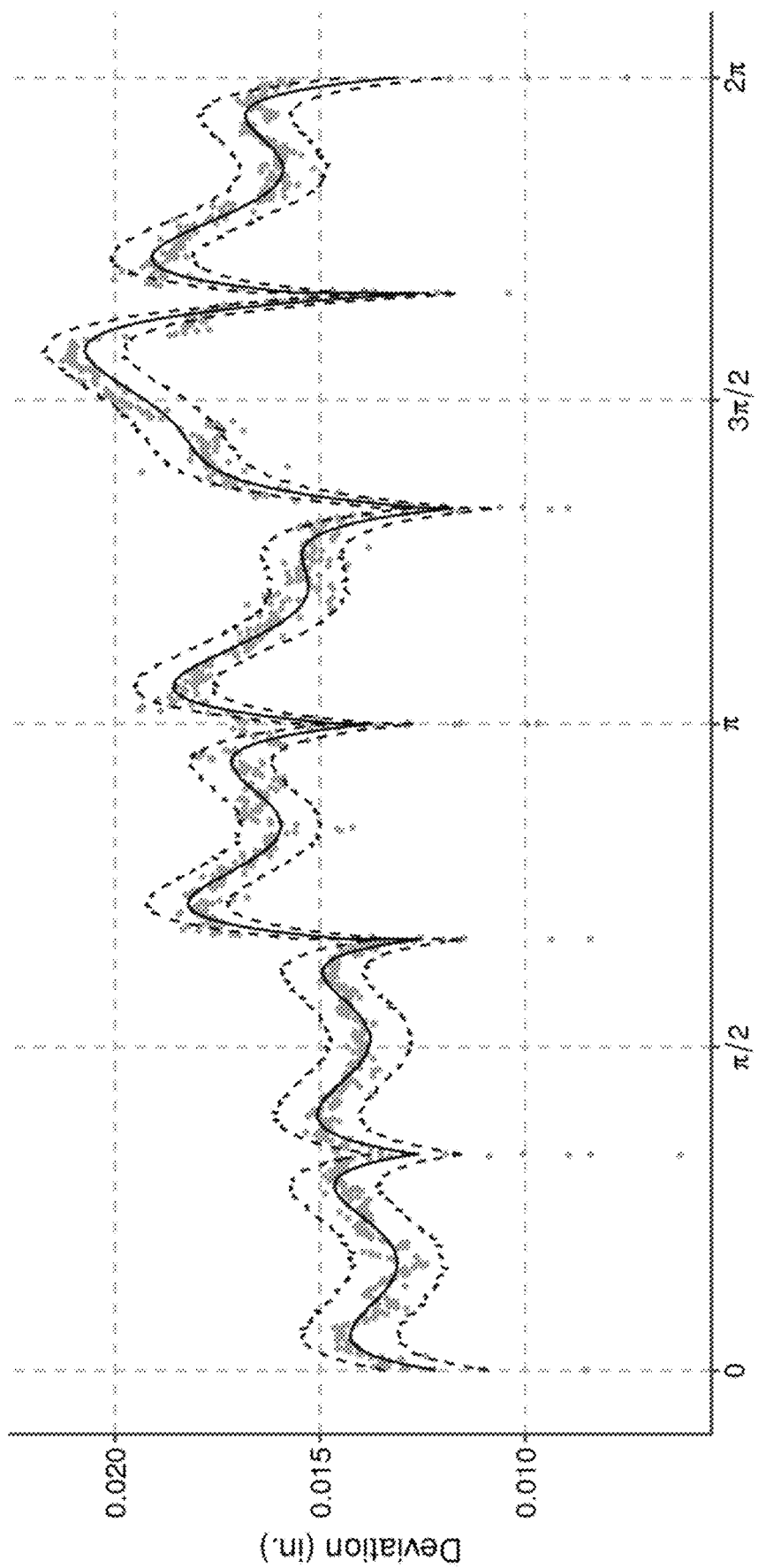

Next, we look at a hexagonal cavity of size 1.8" that is contained in a cylinder of small height and nominal radius 3". This constitutes a product from a shape class 2 manufactured under the process C. Just as before, our method yields a deviation model with good predictive performance for this shape as shown in FIG. 10d.

Figure 11A:
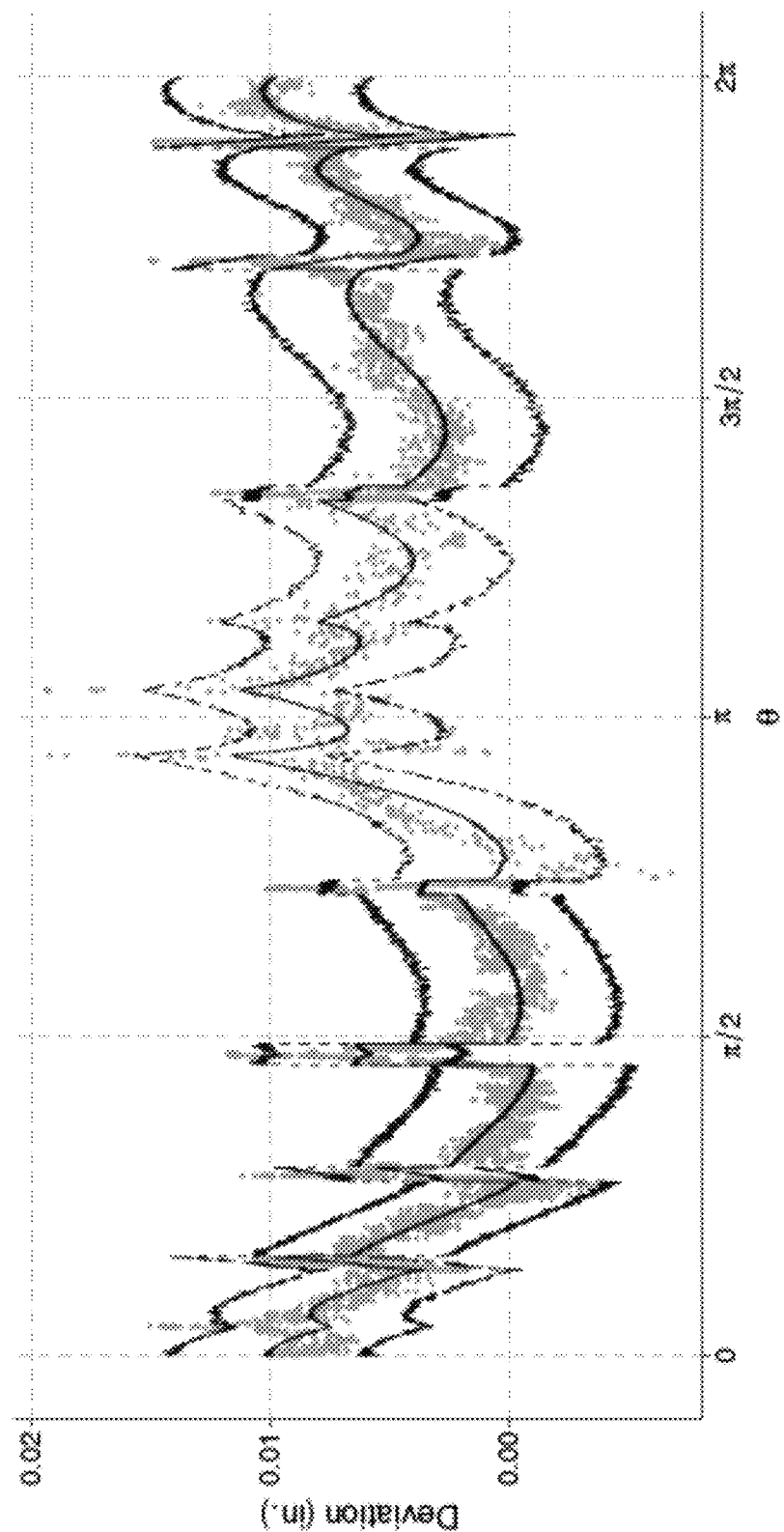
FIGS. 11a and 11b are in-plane deviations (dots) for two free-form shapes, and the posterior predictions obtained from the deviation models according to the present disclosure.
Figure 11B:
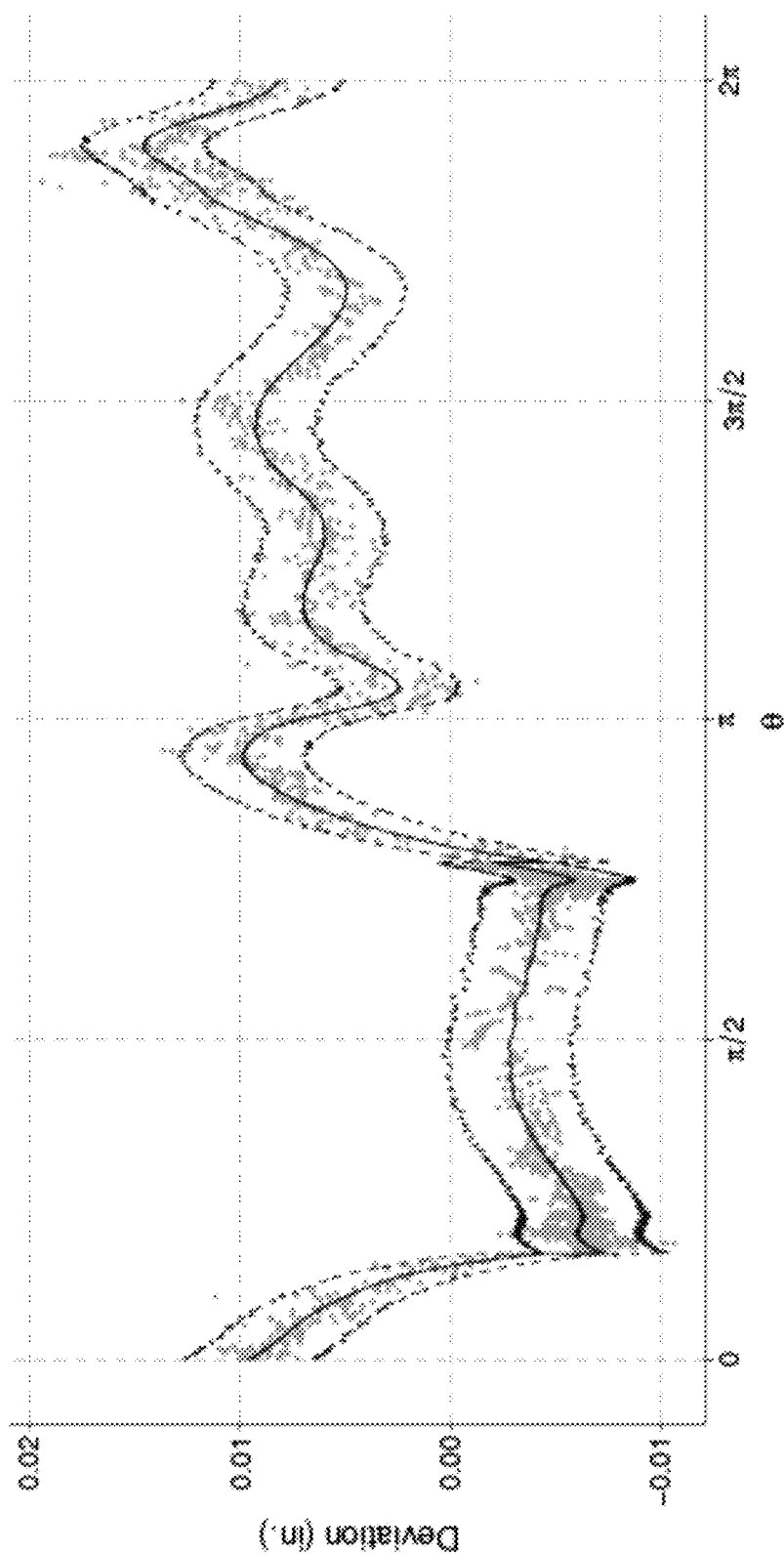

The last case study includes two free-form shapes of small height manufactured under process B. Modeling these deviations is complicated by the geometric complexity of the shapes. Our connectable ELM structures have a broad scope of application and can immediately accommodate both of these free-form shapes. FIGS. 11a and 11b summarize the posterior predictions of our models. The ability of our methodology to enable automated and rapid deviation modeling of these complicated free-form shapes is a particularly significant demonstration of its effectiveness for real-life AM systems. Indeed, a key feature of AM is one-of-a-kind manufacturing, and current deviation modeling methods are unable to accommodate geometrically complex free-form shapes with the same ease as our method. In particular, FIGS. 11a and 11b show in-plane deviations (dots) for two free-form shapes under process B, and the posterior predictive mean trends (solid lines), and 95% central posterior predictive intervals (dashed lines) obtained from the final step of our methodology.

Figure 12:
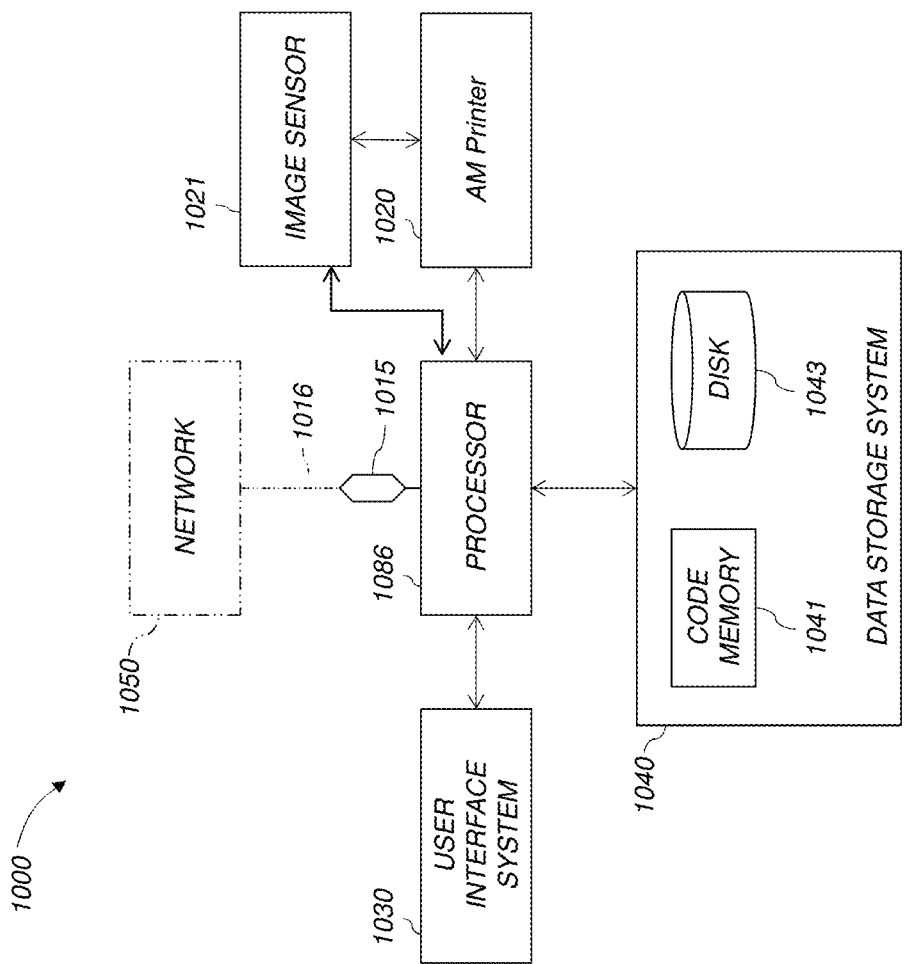
FIG. 12 is a high-level diagram showing components of an exemplary data-processing system for analyzing data and performing other analyses described herein.

Referring to FIG. 12, a high-level diagram showing the components of an exemplary data-processing system 1000 for analyzing data and performing other analyses described herein, and related components. The system includes a processor 1086, an AM printer 1020, a user interface system 1030, and a data storage system 1040. AM printer 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 (e.g., 3D scanners) and/or displayed using display units (included in user interface system 1030) which can each include one or more of systems 1086, 1030, 1040, and can each connect to one or more network(s) 1050. The digital scanner of the imaging sensor 1021 can be employed to capture visual representations of a physical object. The 3D scanner of the imaging sensor 1021 can include cameras or sensors employed to generate dense point clouds or polygon meshes used in 3D modeling. Additionally, it can be implemented using technology including but not limited to: 3D digitizers; laser scanners; structured light scanners; laser pulsed scanners; white light scanners; (Light Detection And Ranging) LIDAR; digital cameras; and structured light 3D cameras. As an example, the system 1000 can be employed to perform 3D printing followed by 3D scanning. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as the AM printer 1020, user interface system 1030, and data storage system 1040 are shown separately from the data processing system 1086 but can be stored completely or partially within the data processing system 1086.

The AM printer 1020 can include one or more devices configured to provide digital content records to the processor 1086. The processor 1086, upon processing of digital content can provide the same to the AM printer 1020, to generate an output shape.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data, whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those having ordinary skill in the art will recognize that numerous modifications can be made to the specific implementations described above. The implementations should not be limited to the particular limitations described. Other implementations may be possible.

The invention claimed is:

1. A method performed by a computer system including a processor and a memory for providing a 3D shape model for a new process in an additive manufacturing (AM) system, comprising:
   receiving an unoptimized 3D model of one or more shapes based on a first process;
   receiving deviation information based on the first process, the deviation information of the first process defines AM deviations of the one or more shapes, both in-plane and out-of-plane, based on the first process;
   baseline deviation modeling of the first process based on the received unoptimized 3D model and the received deviation information and performing an initial optimization to minimize deviation under the first process for the one or more shapes, wherein the initial optimization step of the baseline deviation modeling of the first process is automatically performed using a Bayesian extreme learning machine architecture;
   generating an optimized 3D model for the one or more shapes based on the first process based on the initial optimization;
   applying a transfer function that connects deviation data of the first process including the baseline deviation model, the unoptimized 3D model, and the AM deviations for the one or more shapes to deviation information of a second process to thereby generate a baseline model for the second process for the one or more shapes;
   receiving deviation information based on the second process, the deviation information of the second process defines AM deviations, both in-plane and out-of-plane, based on the second process;

adaptively modeling the deviations of the second process based on the generated baseline model and the deviation information of the second process and performing a secondary optimization to minimize deviation under the second process for the one or more shapes, wherein the secondary optimization step of the adaptive deviation model of the second process is automatically performed using a Bayesian extreme learning machine architecture;

generating an optimized 3D model for the one or more shapes based on the second process and on the adaptive deviation modeling step; and generating a compensation plan for additively manufacturing the one or more shapes between the first and the second processes.

2. The method of claim 1, the baseline deviation modeling includes: initial optimizing of an initial deviation model that can be applied to the received unoptimized 3D model based on the received deviation information for the first process to generate minimum deviation when additively manufacturing the one or more shapes based on the first process.

3. The method of claim 2, the optimization of the baseline deviation modeling is based on a least mean squares deviation minimization.

4. The method of claim 1, the adaptive deviation modeling includes:
secondary optimizing of a deviation model that can be applied to the generated baseline model for the second process based on the received deviation information for the second process to generate minimum deviation when additively manufacturing the one or more shapes based on the second process.

5. The method of claim 4, the optimization of the adaptive modeling of deviation is based on a Bayesian extreme learning machine architecture.

6. The method of claim 4, the optimization of the adaptive modeling of deviation is based on a least mean squares deviation minimization.

7. A method performed by a computer system including a processor and a memory for providing a 3D shape model for a new shape in an additive manufacturing (AM) system, comprising:
receiving an unoptimized 3D model of a first shape based on a process;
receiving deviation information based on the process, the deviation information of the process defines AM deviations, both in-plane and out-of-plane, for the first shape based on the process;
baseline deviation modeling of the first process based on the received unoptimized 3D model and the received deviation information and performing an initial optimization to minimize deviation under the process for the first shape, wherein the initial optimization step of the baseline deviation modeling of the process is automatically performed using a Bayesian extreme learning machine architecture;
generating an optimized 3D model for the first shape based on the process based on the initial optimization;
receiving an unoptimized 3D model of a second shape based on the process;
applying a delta function to the generated optimized 3D model for the first shape, observed deviation data for the second shape, and to the received unoptimized 3D model of the second shape, the delta function connects the optimized 3D model of the first shape to the unoptimized 3D model of the second shape based on the process, the delta function connects deviation data of the first shape including the baseline deviation model, the unoptimized and optimized 3D models of the first shape, and the AM deviations for the first shape to the unoptimized 3D model of the second shape and the AM deviations of the second shape based on the process;
adaptively modeling deviations of the second shape based on the applied delta function and the received unoptimized 3D model of the second shape and performing a secondary optimization to minimize deviation under the process for the second shape, wherein the secondary optimization step of the adaptive deviation model under the process is automatically performed using a Bayesian extreme learning machine architecture;
generating an optimized 3D model for the second shape based on the process and on the adaptive deviation modeling step; and
generating a compensation plan for additively manufacturing the second shape based on the process.

8. The method of claim 7, the baseline deviation modeling includes: initial optimizing of an initial deviation model that can be applied to the received unoptimized 3D model based on the received deviation information for the first shape based on the process to generate minimum deviation when additively manufacturing the first shape based on the process.

9. The method of claim 8, the optimization of the baseline deviation modeling is based on a least mean squares deviation minimization.

10. The method of claim 7, the adaptive deviation modeling step includes:
secondary optimizing of a deviation model that can be applied to the output of the delta function to generate minimum deviation when additively manufacturing the second shape based on the process.

11. The method of claim 10, the optimization of the adaptive modeling of deviation is based on a Bayesian extreme learning machine architecture.

12. The method of claim 10, the optimization of the adaptive modeling of deviation is based on a least mean squares deviation minimization.

13. A method performed by a computer system including a processor and a memory for providing a 3D shape model for a new process and new shape in an additive manufacturing (AM) system, comprising:
receiving an unoptimized 3D model of a first shape based on a first process;
receiving deviation information based on the first process, the deviation information of the first process defines AM deviations of the first shape, both in-plane and out-of-plane, based on the first process;
baseline deviation modeling of the first process based on the received unoptimized 3D model and the received deviation information and performing an initial optimization to minimize deviation under the first process for the first shape, wherein the initial optimization step of the baseline deviation modeling of the first process is automatically performed using a Bayesian extreme learning machine architecture;
generating an optimized 3D model for the first shape based on the first process based on the initial optimization;
applying a transfer function that connects deviation data of the first process including the baseline deviation model, the unoptimized 3D model, and the AM deviations for the first shape to deviation information of a second process to thereby generate a baseline model for the second process for the first shape;

receiving deviation information based on the second process, the deviation information of the second process defines AM deviations, both in-plane and out-of-plane for the first shape, based on the second process;

firstly adaptively modeling the deviations of the second process based on the generated baseline model and the deviation information of the second process and performing a secondary optimization to minimize deviation under the second process for the first shape, wherein the secondary optimization step of the adaptive deviation model of the second process is automatically performed using a Bayesian extreme learning machine architecture;

generating an optimized 3D model for the first shape based on the second process and on the adaptive deviation modeling step;

receiving an unoptimized 3D model of a second shape based on the second process;

applying a delta function to the generated optimized 3D model for the first shape under the second process, observed deviation data for the second shape under the second process, and to the received unoptimized 3D model of the second shape under the second process, the delta function connects the optimized 3D model of the first shape to the unoptimized 3D model of the second shape based on the second process, the delta function connects deviation data of the first shape based on the second process including the baseline deviation model, the unoptimized and optimized 3D models of the first shape, and the AM deviations for the first shape to the unoptimized 3D model of the second shape and the AM deviations of the second shape based on the second process;

secondly adaptively modeling deviations of the second shape based on the applied delta function and the received unoptimized 3D model of the second shape under the second process and performing a third optimization to minimize deviation under the second process for the second shape, wherein the third optimization step of the adaptive deviation model under the second process is automatically performed using a Bayesian extreme learning machine architecture;

generating an optimized 3D model for the second shape based on the second process and on the adaptive deviation modeling step; and generating a compensation plan for additively manufacturing the second shape based on the second process.

14. The method of claim 13, the baseline deviation modeling includes:
initial optimizing of an initial deviation model that can be applied to the received unoptimized 3D model based on the received deviation information for the first process to generate minimum deviation when additively manufacturing the first shape based on the first process.

15. The method of claim 13, the first adaptive modeling deviations includes:
optimizing of a deviation model that can be applied to the transformed baseline model for the second process based on the received deviation information for the second process to generate minimum deviation when additively manufacturing the first shape based on the second process.

16. The method of claim 15, the optimizations of the first adaptive modeling of deviations is based on a Bayesian extreme learning machine architecture.

17. The method of claim 13, the second adaptive modeling deviations include:
optimizing of a deviation model that can be applied to the output of the delta function to generate minimum deviation when additively manufacturing the second shape based on the second process.

18. The method of claim 17, the optimizations of the second adaptive modeling of deviations is based on a Bayesian extreme learning machine architecture.

* * * * *